US008296264B1

(12) United States Patent
Yeresov et al.

(10) Patent No.: US 8,296,264 B1
(45) Date of Patent: Oct. 23, 2012

(54) METHOD AND SYSTEM FOR FILE-LEVEL CONTINUOUS DATA PROTECTION

(75) Inventors: Alexander E. Yeresov, Moscow (RU);
Andrey A. Zorin, Moscow (RU);
Maxim V. Lyadvinsky, Moscow (RU);
Serguei M. Beloussov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 499 days.

(21) Appl. No.: 12/263,474

(22) Filed: Nov. 2, 2008

Related U.S. Application Data

(63) Continuation-in-part of application No. 12/060,452, filed on Apr. 1, 2008, now Pat. No. 8,051,044.

(51) Int. Cl.
*G06F 17/30* (2006.01)

(52) U.S. Cl. ........................................................ 707/646

(58) Field of Classification Search .................. None
See application file for complete search history.

(56) References Cited

U.S. PATENT DOCUMENTS

| | | | | |
|---|---|---|---|---|
| 6,016,536 | A * | 1/2000 | Wu et al. | 711/173 |
| 6,505,216 | B1 * | 1/2003 | Schutzman et al. | 1/1 |
| 6,802,025 | B1 * | 10/2004 | Thomas et al. | 714/15 |
| 2007/0204104 | A1 * | 8/2007 | Wan et al. | 711/114 |
| 2008/0151291 | A1 * | 6/2008 | Ohno et al. | 358/1.15 |

\* cited by examiner

*Primary Examiner* — Bai D. Vu
(74) *Attorney, Agent, or Firm* — Bardmesser Law Group

(57) ABSTRACT

Continuous data protection is performed as two parallel processes: creating an initial backup by copying a data as a file/directory from the storage device into the backup storage, and copying the data to be written to the data storage as a part of a file/directory into the incremental backup. Alternatively, it can be performed as one process: copying the data to be written to the data storage as a part of a file/directory on the storage. A write command to a file system driver is intercepted and redirected to the backup, and the data is written to the incremental backup. If the write command is also directed to a not yet backed up data (a file/directory), the identified data is copied from the storage device to intermediate storage. The write command is executed on the file/directory from the storage device, and the file/directory is copied from the intermediate storage.

19 Claims, 20 Drawing Sheets

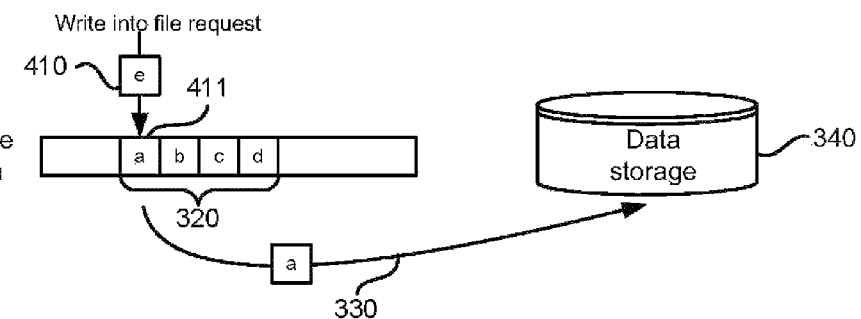
FIG. 4A
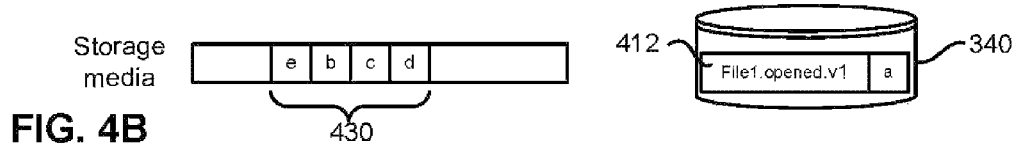
FIG. 4B
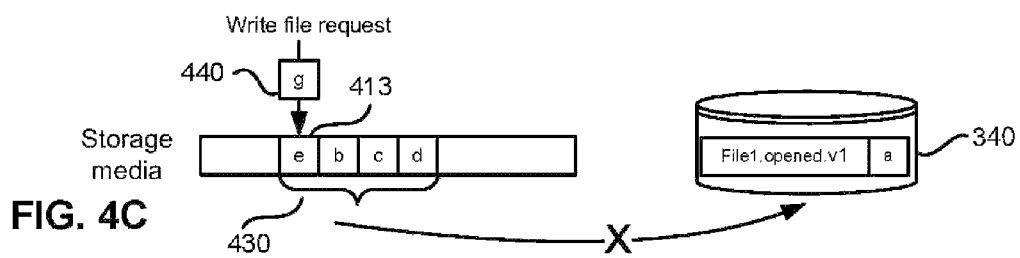
FIG. 4C
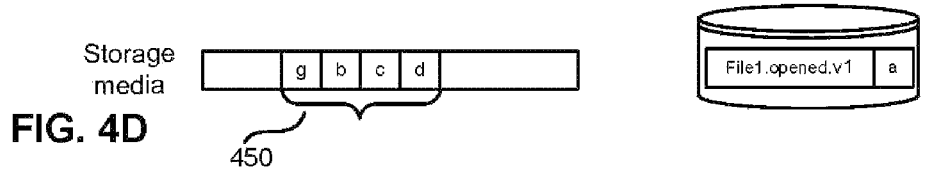
FIG. 4D
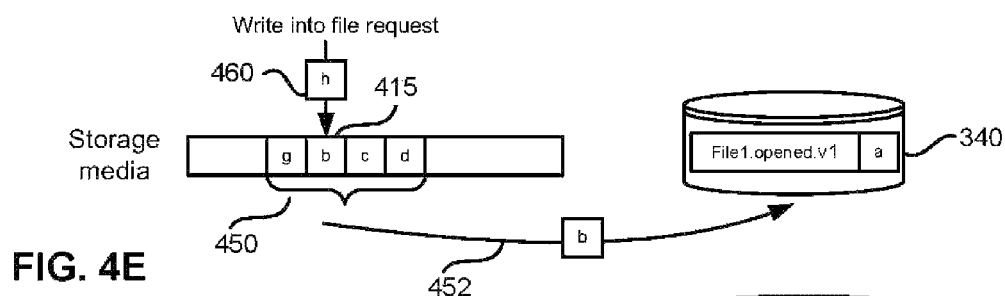
FIG. 4E
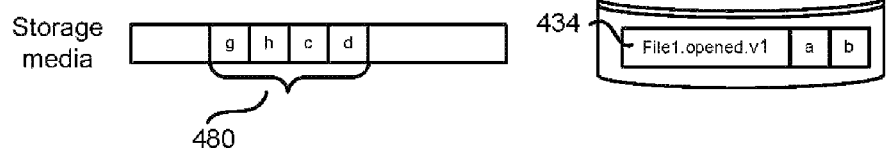

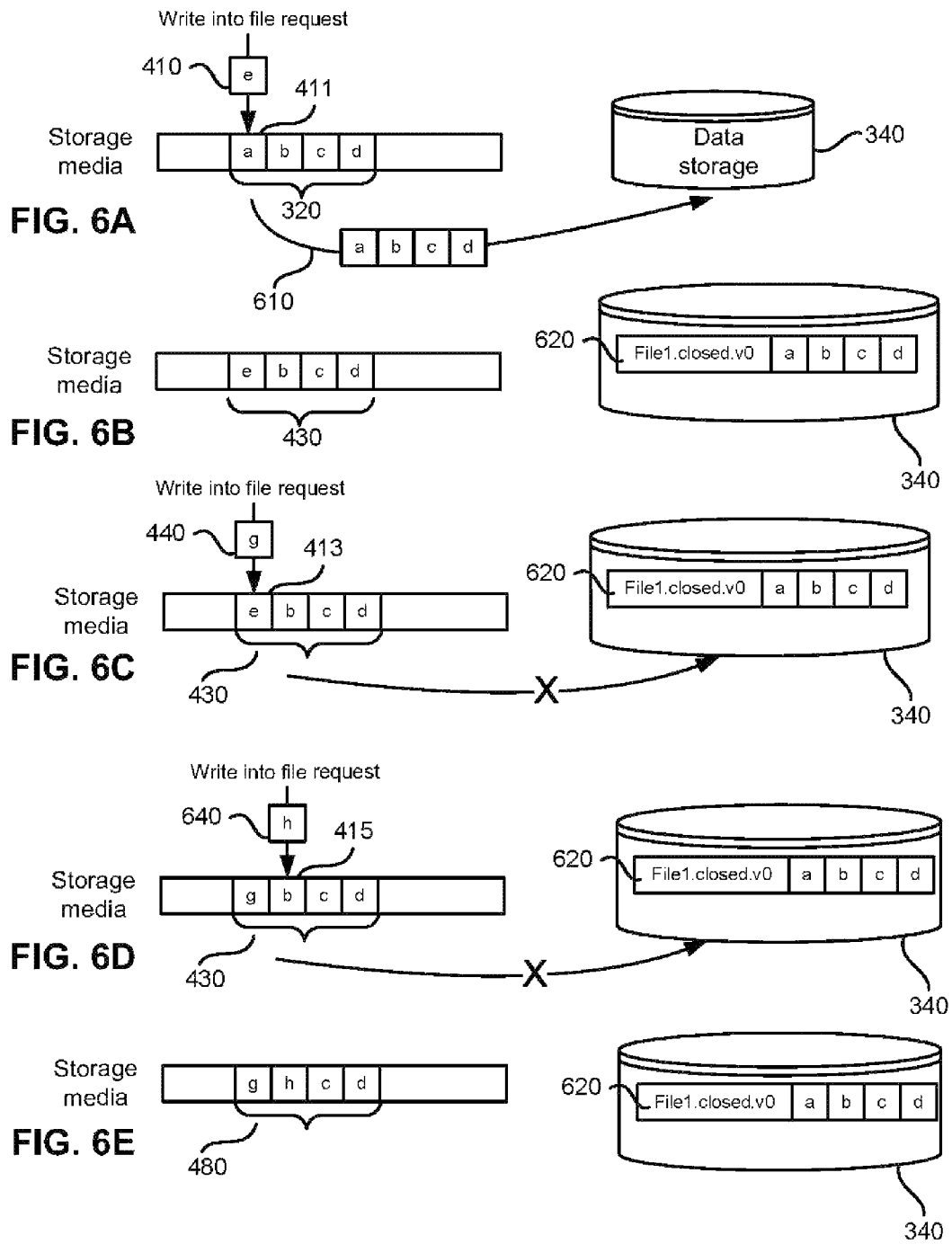

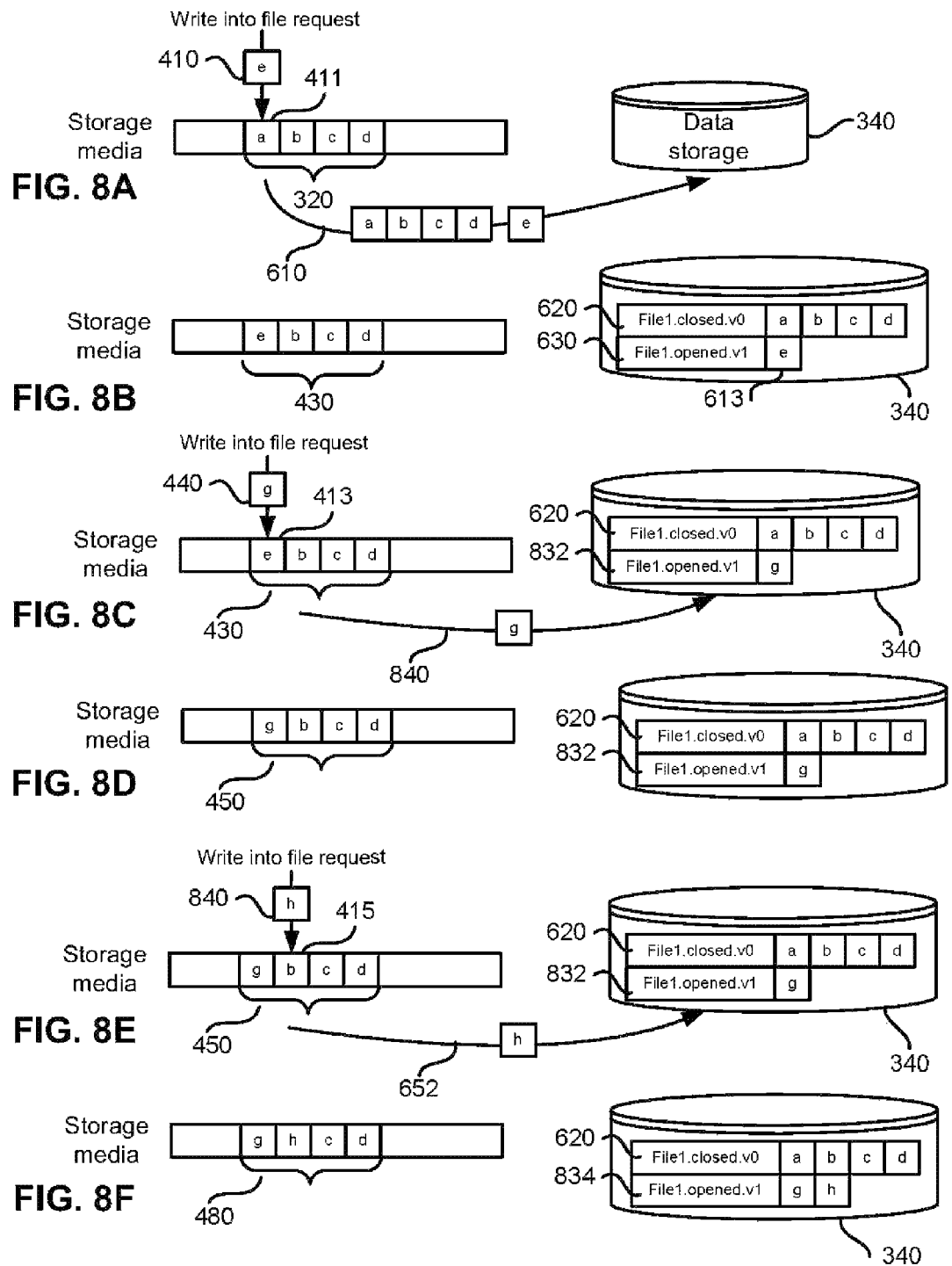

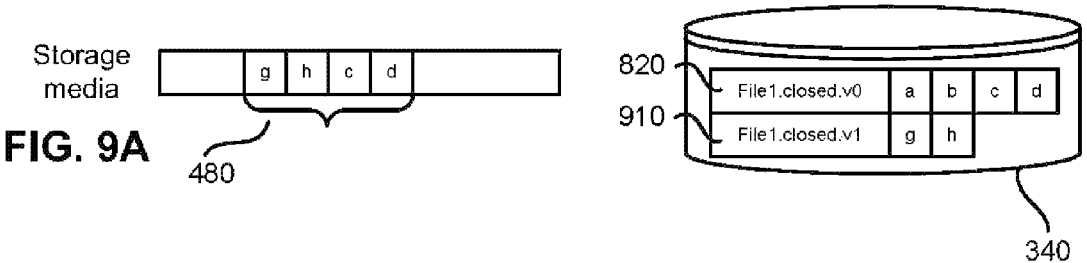
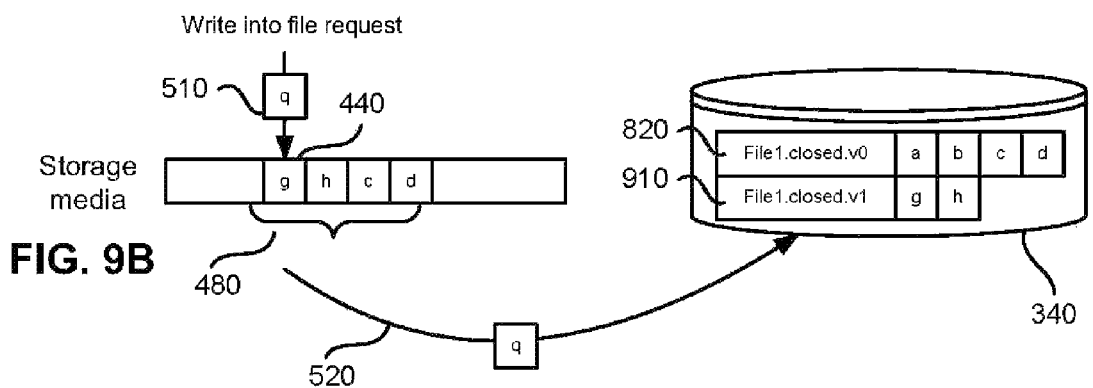
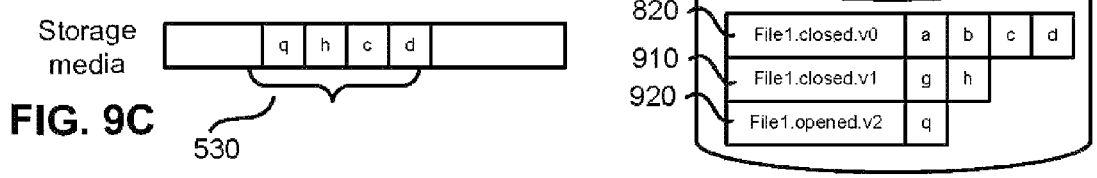

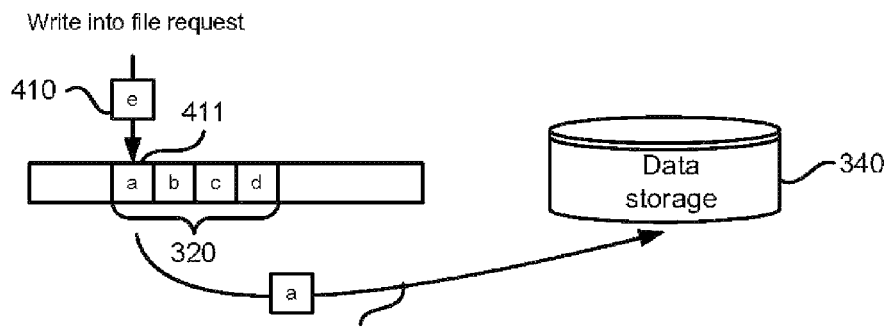
FIG. 11A
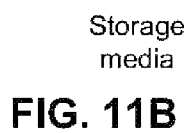
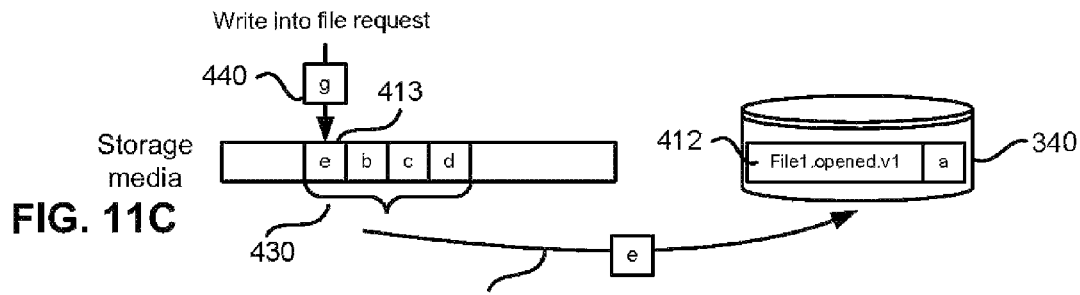
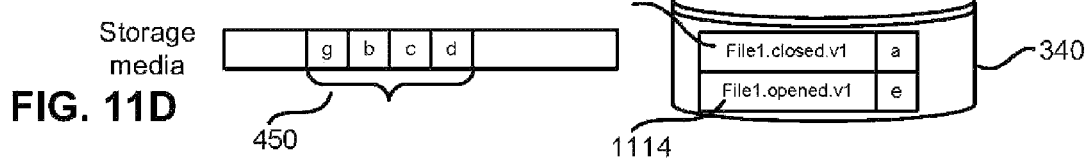
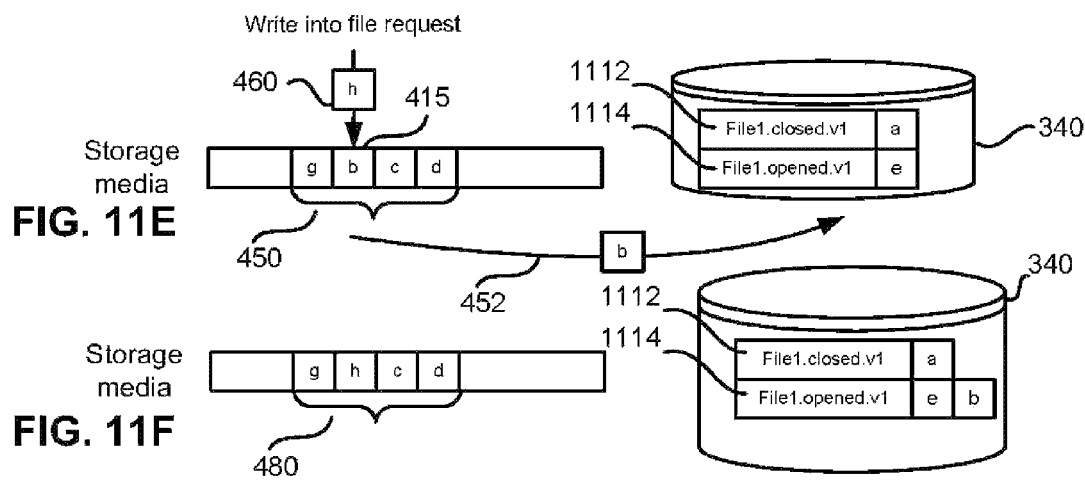

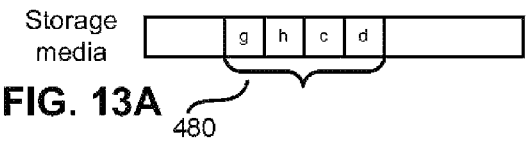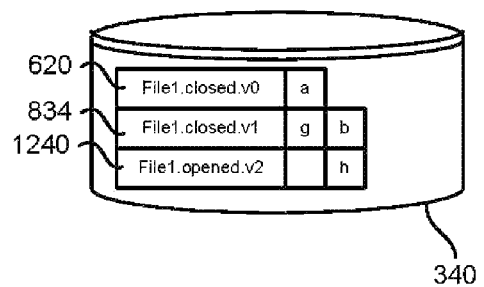
FIG. 13A
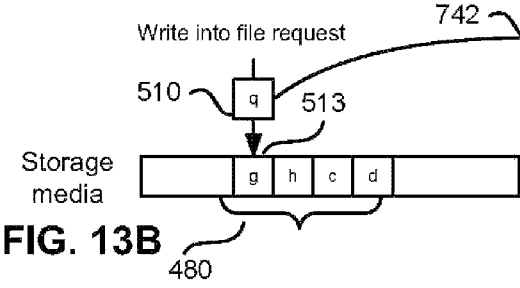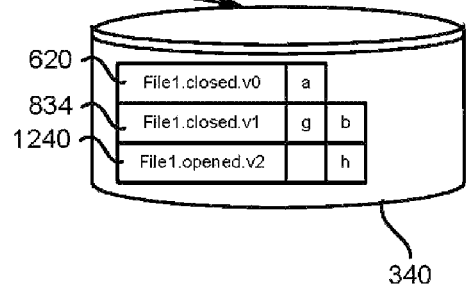
FIG. 13B
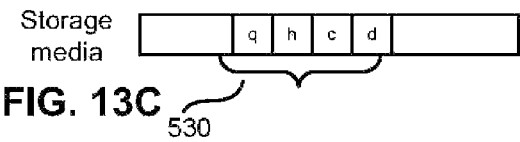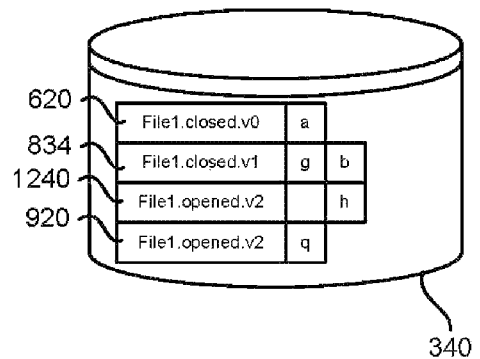
FIG. 13C

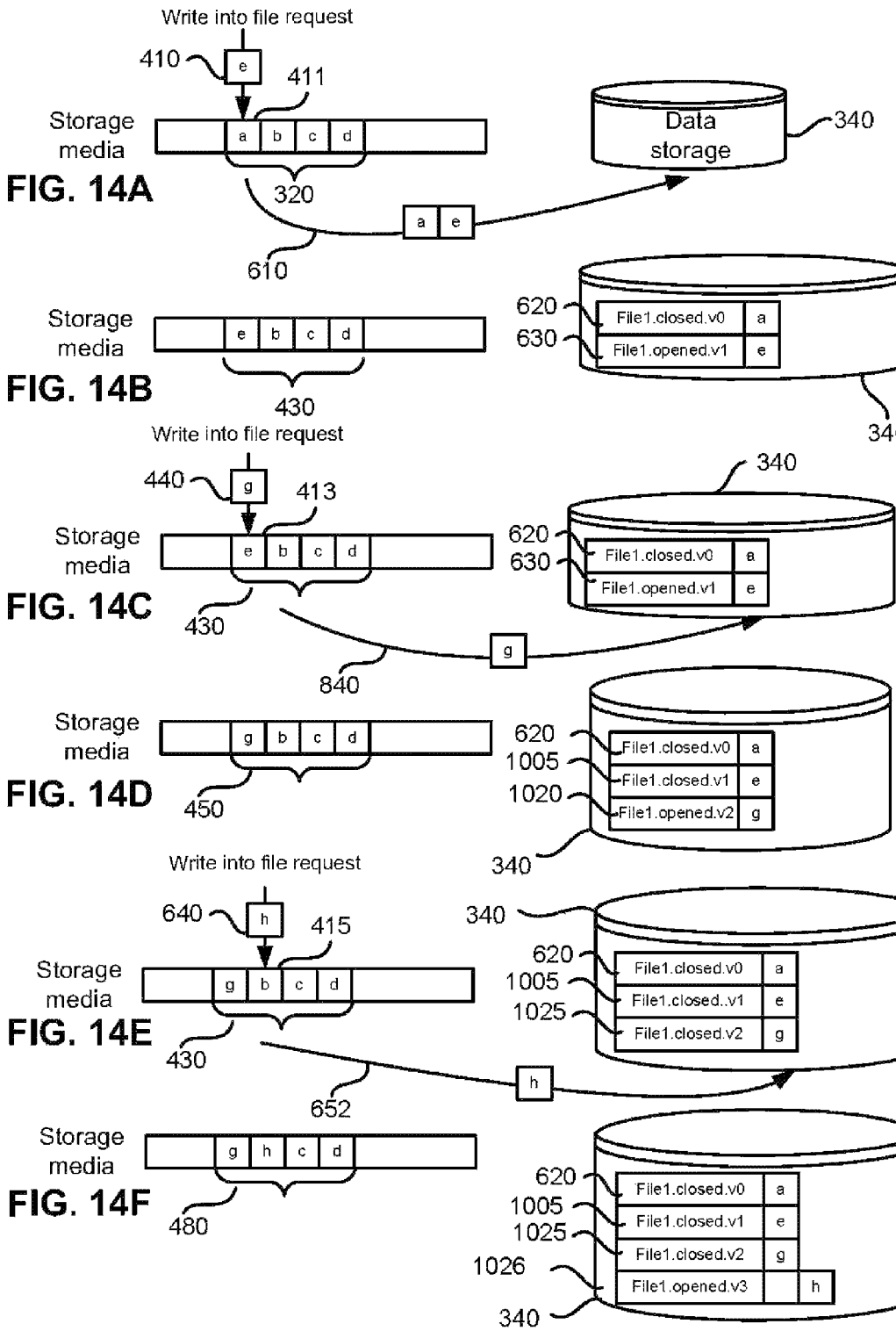

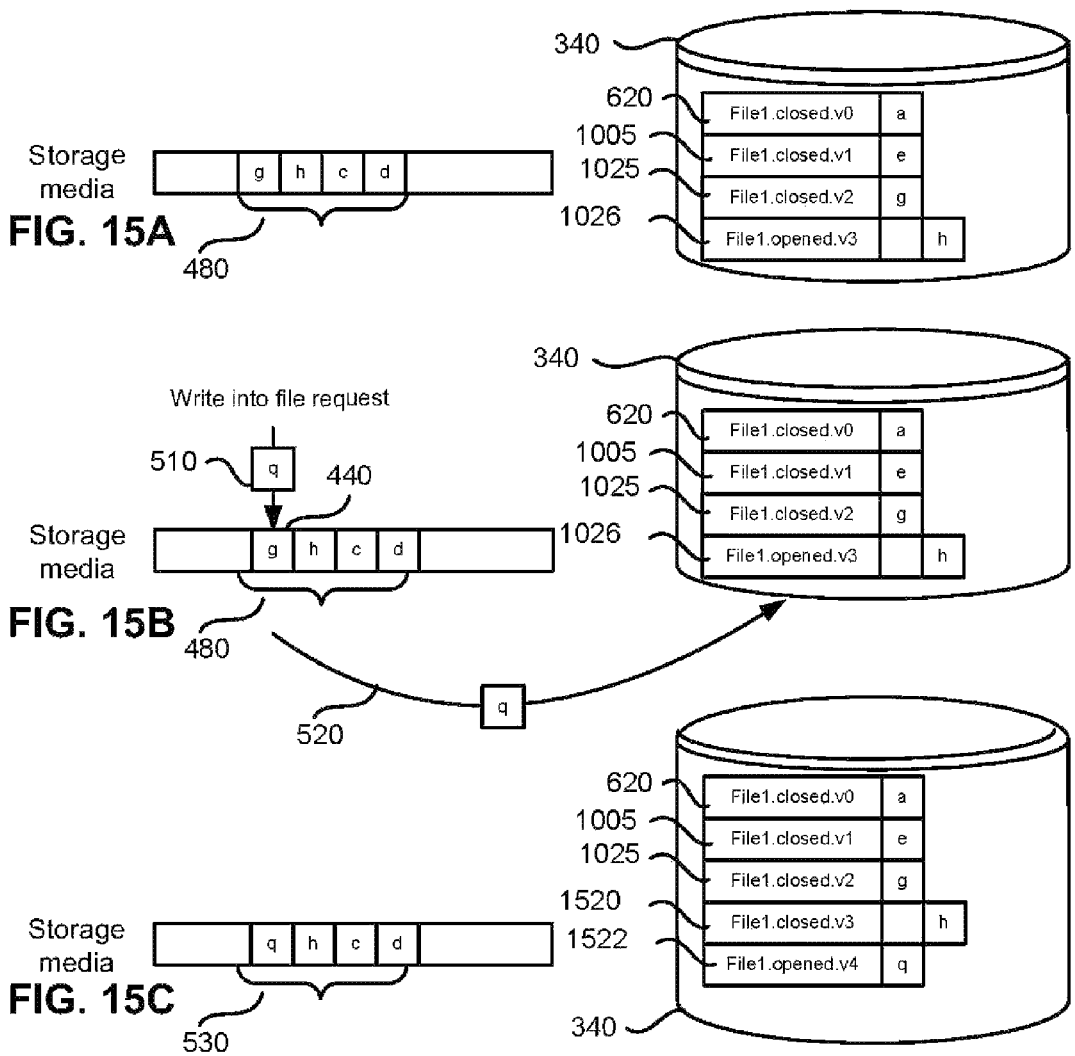

METHOD AND SYSTEM FOR FILE-LEVEL CONTINUOUS DATA PROTECTION

CROSS-REFERENCE TO RELATED APPLICATIONS

This application is a continuation in part of U.S. patent application Ser. No. 12/060,452, filed on Apr. 1, 2008, which is incorporated by reference herein in its entirety.

BACKGROUND OF THE INVENTION

1. Field of the Invention

The present invention relates to continuous data protection, and more particularly, to continuously archiving data on a storage device within a pre-set time period.

2. Background Art

Currently, there are a number of conventional methods that relate to organization of data archiving. One of these methods is a backup of the entire hard drive, which typically involves copying of the hard drive contents onto some other medium (such as, for example, another hard disk drive, a DVD ROM, a DVD RAM, a flash disk, etc.). The primary disadvantage of such a method is a need to backup what can be a very large amount of data, which, on the one hand, results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically, the contents of the hard disk drive is archived, or stored somewhere once. After that, only the data that has been changed, or added, since the previous backup, or since the pervious incremental backup, is actually archived. Recovery of the data from the archive typically involves merging of the original backup and the various incremental backups.

For conventional backups it is possible to restore data to the point at which the backup was taken. In case of a system failure, the data can be restored from the last incremental backup. In this case, data from the time of this incremental backup creation up to the time of a system failure will be lost.

On the other hand, continuous data protection is different from traditional backups. With continuous data protection, an initial backup can be created as in the case of a traditional backup, but the new data (which is written on the storage device) is backed up in the incremental backup (so called a continuous incremental backup, or open-for-editing incremental backup) in parallel to writing on the storage device. In other words, the new data is backing up to the incremental backup during the process of the new data being written to the storage device. However, if a user decides to make a backup of data from the data storage device after a certain time period, the backup is not allowed.

In some cases a full back up is not needed. Instead, only the previous versions of files or parts thereof (i.e., data sets), which are rewritten as a result of write file requests, can be saved (i.e., backed up).

Symantec's GoBack provides a continuous data protection at the block level backup. However, GoBack uses a buffer space for storage of the changed files using FIFO scheme (First In First Out). This limits the amount of data, and, eventually, limits how far back it is possible to go in order to restore data. Thus, when the buffer space becomes full, GoBack starts to delete its earlier checkpoints and the data stored earlier.

GoBack technology is based on a file-level monitoring and logging technique. It needs to consume a large chunk of the hard disk space to create a change history file. A monitoring system picks up every file change, regardless of whether or not it is worth recording. A simple system restart will generate hundreds of file changes to be logged. The details of change history logging file consumes the hard disk space quickly and puts tremendous burden on a system resources.

Accordingly, there is a need in the art for an effective and efficient method of continuous protection of files, with minimal time and effort, so data backup process allows a computer system to remain online, with possibility to restore data from the backup at the time of the system failure up to the pre-selected point of restoration.

SUMMARY OF THE INVENTION

Accordingly, the present invention provides a system and method for continuous data protection that substantially overcomes the disadvantages of the related art.

A system includes a storage device and a backup storage device for storing files and directories. According to an exemplary embodiment, continuous data protection can provide data restoration from a continuous incremental backup to the point in time before a system failure. Also, a user can select restoration points for recovery, as in the case of traditional incremental backup. The continuous data protection is based on a file-level monitoring.

In one embodiment, the continuous data protection procedure is performed as two parallel processes: copying a data as a file/directory from the storage device into the backup storage device (i.e., creating an initial backup), and copying the data to be written to the data storage as a part of a file/directory into the incremental backup. Alternatively, it can be performed as one process: copying the data to be written to the data storage as a part of a file/directory on the storage. When a write command is directed to a file system driver, it is intercepted and redirected to the backup storage, and the data, which is to be written in accordance with the write request, is written to the incremental backup on the backup storage.

If the write command is also directed to a data (a file/directory) identified for backup that has not yet been backed up, the identified data (a file/directory) is copied from the storage device to the intermediate storage device. Then, the write command is executed on the identified file/directory from the storage device, and the file/directory is copied from the intermediate storage device to the backup storage device.

The intermediate storage device can be external to a file system of a computer that includes the storage device, or it can be located on the same storage device, or it can be a separate partition of the storage device, or it can be a file within a file system. The system suspends a write command to the storage device during the initial data backup process, if the intermediate storage device has reached a pre-set data capacity, and copies a selected amount of data from the intermediate storage device to the backup storage device. Thus, up-to-the-minute data is backed up into the backup. In case of a system failure, the last changed data can be restored and will not be lost.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 4-5 illustrate an exemplary embodiment, where, upon write into a file request, only the parts of the file to be written over by a new data are backed up;

FIGS. 6-7 illustrate an exemplary embodiment, where, upon write into a file request, the entire file is backed up into data storage and the parts of the file to be written over by a new data are backed up;

FIGS. 8-9 illustrate an exemplary embodiment, where, upon write into a file request, the entire file is backed up into a data storage and only the new parts of the file to be written into the data storage are backed up;

FIG. 11 illustrate an exemplary embodiment, where, upon write into a file request, the parts of the file, which are to be rewritten by the new data, are backed up;

FIGS. 12-13 illustrate an exemplary embodiment, where, upon write into a file request, parts of the file, which are to be rewritten by the new data, are backed up into a data storage along with the new data;

FIGS. 14-15 illustrate an exemplary embodiment, where upon write into a file request, parts of the file, which are to be rewritten by the new data sets, are backed up into a data storage and each of the new data sets is backed up into the data storage;

DETAILED DESCRIPTION OF EMBODIMENTS OF THE INVENTION

Reference will now be made in detail to the embodiments of the present invention, examples of which are illustrated in the accompanying drawings.

A computer file system is located on the data storage device and interacts with storage device at a block level. For example, read and write operations are performed in connection with data areas that have sizes that are divisible by the size of an individual block. The sequence of the blocks in the storage is ordered and each block has its own number. The computer system can include several such storage devices and the file system can take only a portion of one such a storage, the whole storage, or several such storages or parts there of. On a disk or a storage device, these type of storages are usually located in partitions, taking the entire partition.

Figure 1:
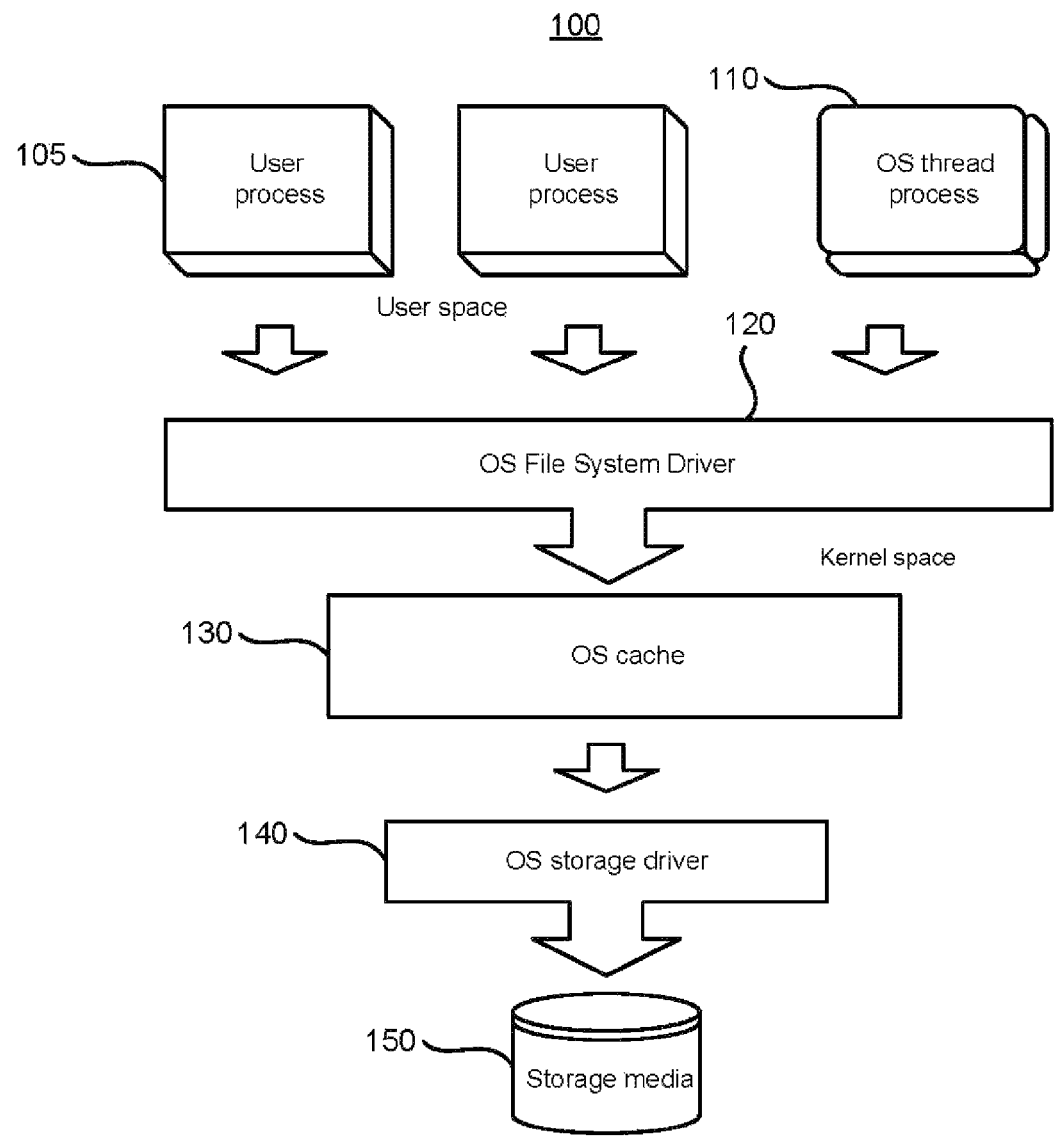
FIG. 1 illustrates processes and objects in a computer system in accordance with the exemplary embodiment.

The file systems can be subdivided into several categories, including the housekeeping data of the file system volume, file metadata, file data, and free space not occupied by the other data. A file system driver embedded into the operating system can provide servicing for the file system. FIG. 1 illustrates an exemplary processes and architecture of a computer system, 100. The computer system 100 includes a data storage device 150 accessible by one or more user processes 105 or OS thread processes 110. OS user processes 100 or OS thread processes 110 can request to read or write data to the storage media 150 via a file system request.

This request can be directed to a file system driver 120, which defines where in the storage media the relevant data blocks are located. The request can then be directed (optionally) to the OS cache 130, where the requested data is currently cached. If the requested data is located in the OS cache 130, the system can complete the requested operation by allowing the user process 100 or OS thread process 110 to perform a read/write operation on the cached data. If the requested data is not located in the OS cache 130 or is otherwise unavailable (e.g., the space in the cache must be freed pursuant to an OS algorithm), the request is transmitted for execution to the OS storage driver 140. The OS storage driver subsequently performs the requested operation on the selected data located in the storage media 150.

The OS storage driver 140 interacts with the storage media 150 in a block mode. As discussed above, in the context of data management, a block is a group of records on a storage media. Blocks are typically manipulated as units. For example, a disk drive can read and write data in 512-byte blocks. Accordingly, the OS storage driver 140 can receive requests for data read and write using blocks of the selected block size.

Each data block is associated with a number or label corresponding to the type of the operation to be performed. Thus, the driver associated with the data write operation acquires a set of numerical pairs (e.g., a data block and a number) in order to process the data write command.

Figure 2A:
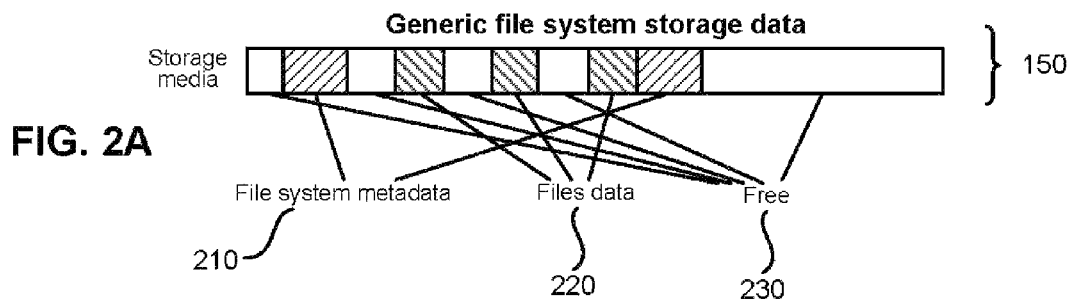
FIGS. 2A-2C illustrate exemplary embodiments of the system storage, including an intermediate data container for data backup in accordance with the exemplary embodiment.
Figure 2B:
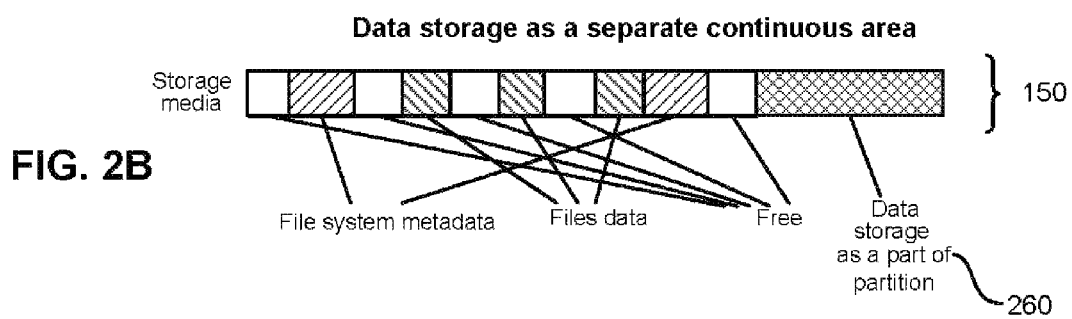
Figure 2C:
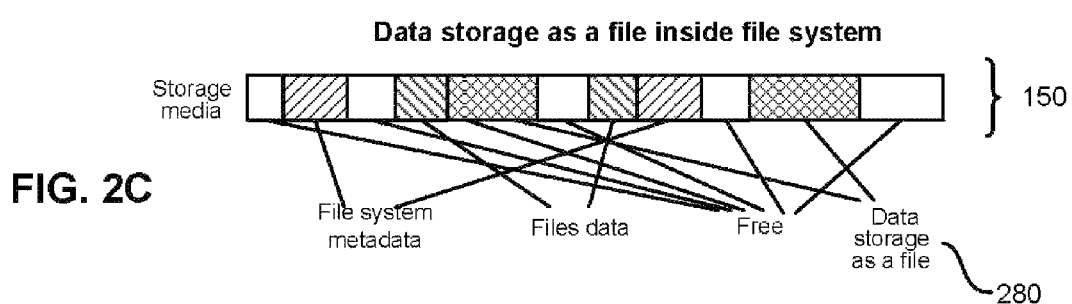

FIG. 2 illustrates an exemplary embodiment of a system storage device. The storage medium 150 is a file system storage data device. From the point of view of the file system, files/directories, as blocks of data in the block data storage medium 150, can be defined by several different classes. Depending on the file system type, the storage medium 150 can store data specific for the volume, metadata of the file system 210, file data 220, or free space 230 not currently taken up by other data. Generally, a specific data type can be allocated to an entire data block and different data types cannot be combined in one block. A file system can combine different data into one block under special circumstances The data storage (i.e., a backup storage) can be placed on the storage media as a part 260 of a storage media partition, or as a file 280 inside a file system on the storage media. Also, the data storage can be placed on the other storage media on the same server (for example, personal computer, workstation, storage server etc.), or the data storage can be connected via network (such as, for example, LAN, SAN, NAS etc.). Also, note that the data storage can be placed not only on one storage media (i.e., as a part of a storage media), and not only on one partition (i.e., volume). The data storage can be also placed on the few parts of partitions (i.e., volumes), or it can be placed in several files.

Figure 3:
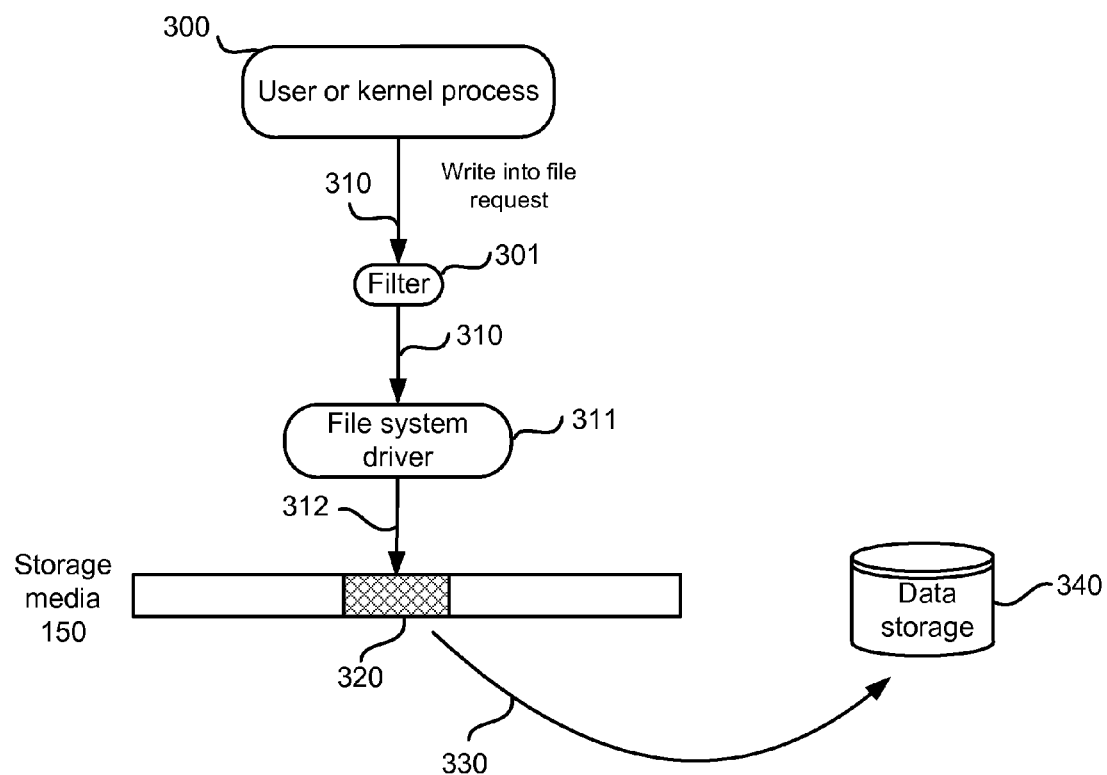
FIG. 3 illustrates a continuous data backup process in accordance with the exemplary embodiment.

FIG. 3 illustrates an exemplary embodiment of the online backup process that addresses the shortcomings of an off-line data backup. For the purposes of illustration, the following example assumes that the backup process for the data of data storage 340 is launched so that the backup process can be performed within the off-line backup procedure.

After a procedure for protecting files and directories is started, a list of protected objects is generated. The list of the protected objects duplicates that part of the file system tree which contains a protected object. For example, the user decides to protect \Folder1\Folder2. Folder1 contains File11 and File12. Folder2 contains File21 and File22. If this is the case, then the following folders inside the tree storage are created: \Storage\Tree\D.Folder1, \Storage\Tree\D.Folder1\D.Folder2, and the following files are stored: Storage\Tree\D.Folder1\D.Folder2\F.File21, Storage\Tree\D.Folder1\D.Folder2\F.File22.

The object creation occurs right after the user has decided to protect \Folder1\Folder2. Note that there are no files created inside the tree storage for \Folder1\File11 and \Folder1\File12, because \Folder1 is not chosen to be a protected one. Special prefixes in object names (D. for folder and F.—for file) are used to avoid the problems when a user decides to protect a folder Folder, having sub-folder object, and moves the folder object out, and then, creates a file Object. If such prefixes are not used, file creation is not reflected in the tree storage because the folder Object already exists there.

Each object created inside the list of objects and residing below a protected folder has an alternate stream which contains timestamp records. Each timestamp record consists of two timestamps—the first one is the time when either user enabled protection on that object or the object became protected due to its appearance in a parent folder, which is already protected, and the second time stamp is either the time when the object became unprotected due to its renaming or removal or FFFFFFFFFFFFFFFF if it is under protection at the moment.

So if a user decides to protect a folder Folder and renames it into AnotherFolder and finally renames it back, then the following records will be placed inside the folder's alternate stream—time1.time2 and time3.FFFFFFFFFFFFFFFF, where time1—a time stamp when the protection was started, time2—a time stamp when Folder was renamed into AnotherFolder, time3—a time stamp when AnotherFolder was renamed into Folder. In addition to the specified timestamps, the records created in the files contain a number of a file record where the data of this file is located (i.e., for the files the records look like time1.time2-RecordNumber).

According to the exemplary embodiment, a list of protected objects can be stored on the data storage device as a part of a backup or it can be stored separately. The file of a database can also be created and backed up on the data storage. The protected objects, storage media (on which protected objects are located), protected objects' metadata, and other data related to the protected objects (such as, for example, storage media, volumes, objects placement) are stored on the data storage. Also, an additional information about the objects selected by the user for protection (such as, timestamps for starting the protection) can be stored on the data storage. Note, that this information can be stored in a form of a database. Each protected object has its own timestamp. An object provides a path to the protected object from the volume's root.

Initially, a user process or a file system process 300 (such as, for example, a disk cache), issues a write file request 310 to the data storage. The write file request 310 is received by the file system driver 311. The write request 310 is also intercepted by the continuous backup filter 301 and can be redirected to the backup located on the data storage 340. So the data that is written to the data storage media 320 is also written to the data storage 340. This process will be described in detail below.

In one embodiment, the file system driver 311 examines an area of a file, where a set of data will be written. If the set of data was not backed up to the data storage 340, then this set of data is backed up to the data storage 340.

A file is divided into some blocks (i.e., data sets). The file can be divided into blocks by a special algorithm. For example, these blocks can be 1024 KB in size. Also, blocks can be created based on a size and a type of the file. For example, block size=file size/A, where A—a constant value for a particular file type or a pre-selected fixed value.

FIGS. 4A-4E illustrate an exemplary embodiment, where, upon write into a file request, only the parts of the file to be written over by a new data are backed up. When a file 320 located on the storage medium 150 (see FIG. 4A FIG. 1) is opened or accessed by a user, a request for re-writing over some parts of the file or a request to rewrite the entire file can be received. In this example, a write request 310 is received for writing into the file 320 a data set 410 in place of a data set 411. Here, the data set is typically a single cluster (i.e., the smallest addressable unit with which the file system works when addressing the disk, usually comprising several disk sectors). The file system structure is superimposed over the clusters.

At this time, a first version of an editable backup file 412 is created on the data storage 340 (see FIG. 4A). A data set 411, which is a part of a file 320, is backed up by a backup operation 330 (see FIG. 4B) into the file 412 on the data storage 340. After the data set 411 is backed up on the data storage 340, the write request 310 is executed and the data set 410 is written in place of the data set 411. Thus, the file 320, having data sets a, b, c and d, is converted into a file 430 populated by data sets e, b, c and d (see FIG. 4B).

Note that in order to write the data set 410 into the file 320, it is not necessary to wait for completion of a backup of the data set 411. The data set 411 can be placed into computer memory or it can be placed into an intermediate container or into a cache of a computer/server.

FIG. 4C illustrates a situation when a write request requires writing the data set 440 into the data set 413 (of the file 430) that has already been backed up. The data set 440 is written over the data set 413. In this scenario, the data set 413 is not backed up onto the data storage 340. The data set e of the file 430 is replaced by the data set g. Thus, the file 430 is converted into a file 450.

FIG. 4E illustrates a situation when a write request requires writing a data set 460 in place of a data set 415. Since the data set 415 has not been backed up to the data storage 340, the data set 415 is backed up by a backup procedure 452 into a first editable version of the backup 412 (see FIG. 4B) located on the data storage 340. After the backup of the data set 415 is completed on the data storage 340, the write request is executed and a data set 460 is written in place of the data set 415. Thus, the file 430 is converted into a file 480 and the backup file 412 is converted into a file 434.

According to the exemplary embodiment, a user can stop working with an open file at any time. It can be done automatically by setting up a data security application in such a way that an open file on the data storage 340 is closed upon invocation of a particular event (such as, for example, an interruption, switching between open files, an expiration of the pre-set time-out, an attempt by a user to save the file or an automatic attempt by a system or an application to save the file, etc.).

Figure 5A:
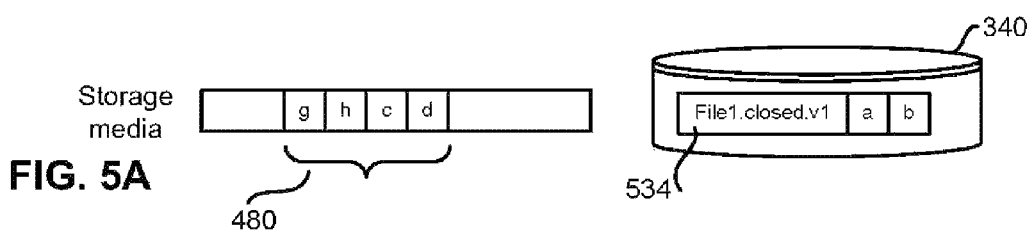
Figure 5B:
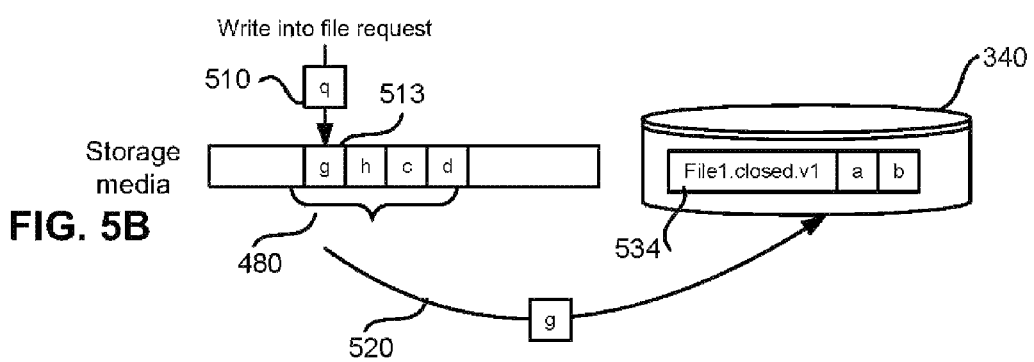
Figure 5C:
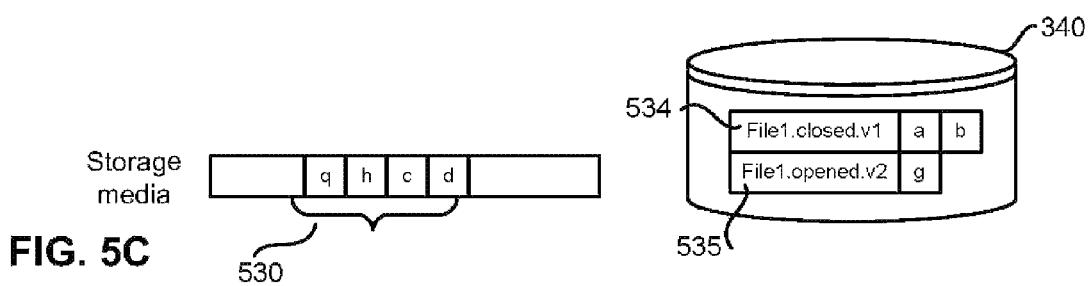

At the time (or after) of closing/saving an open file 480, the open backup 534 of the file 480 on the data storage 340 is also closed (see FIG. 5A). FIG. 5B illustrates a situation when another write request is received (i.e., file is open again for editing by a user). In this example, a write request requires writing a data set 510 in place of the data set 513. A new backup 535 is created on the data storage 340 (see FIG. 5C) and the data set 513 is backed up by a procedure 520 onto the data storage 340. After the backup procedure 520 is completed, the write request is executed and the data set 510 is written in place of the data set 513. Thus, the file 480 is converted into a file 530.

Please note that in order to write the data set 513 into a file on the storage medium 150, it is not necessary to wait until the data set 513 is backed up. The data set 513 can be stored in a computer memory or in an intermediate container. FIGS. 6-7 illustrate an exemplary embodiment, where a write request is received and an entire file is backed up. Also, only the parts of the file to be written over by a new data set are also backed up.

When a file 320 located on the storage medium 150 (see FIG. 1) is opened or accessed by a user, a request for re-writing over some parts of the file or a request to re-write the entire file can be received. In this example, a write request is received for writing into the file 320 a data set 410 in place of a data set 411.

The file 320 is backed up onto the data storage 340 by a procedure 610 as an uneditable zero version 620 (see FIG. 6A). The request to write a data set 410 into the file 320 is executed and the data set 410 replaces the data set 411. Thus, the file 320 is converted into the file 430 (see FIG. 6B).

Please note that in order to write the data set 410 into the file 320 on the storage medium 150, it is not necessary to wait until the data set 411 (or the entire file 320) is backed up. The data set 411 (or the entire file 320) can be stored in a computer memory or in an intermediate container and subsequently moved to the data storage 340.

FIG. 6C illustrates a situation when another write request is received (i.e., file is open again for editing by a user). In this example, a write request requires writing a data set 440 in place of the data set 413. In this embodiment, the file 430 is not backed up to the data storage 340. The write request is executed and the data set 440 is written in place of the data set 430. FIG. 6D illustrates an execution of another write request. The write request is executed and the data set 640 is written in place of the data set 415 and the file 430 is not backed up to the data storage 340. Thus, the file 430 is converted into a file 480 shown in FIG. 6E.

According to the exemplary embodiment, a user can stop working with an open file at any time. It can be done automatically by setting a data security application in such a way that an open file on the data storage 340 is closed upon invocation of a particular event (such as, for example, an interruption, switching between open files, an expiration of the pre-set time-out, an attempt by a user to save the file, some periodic event, or an automatic attempt by a system or an application to save the file, etc.).

Figure 7A:
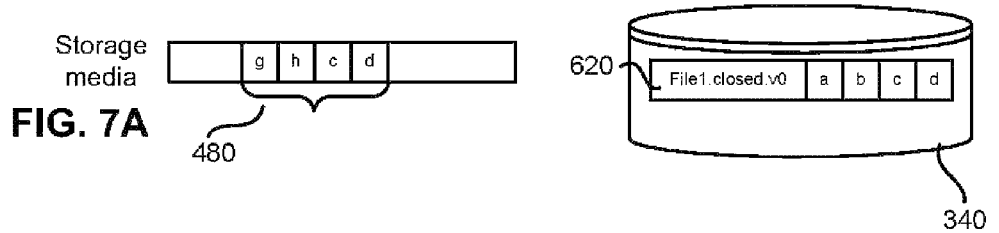
Figure 7B:
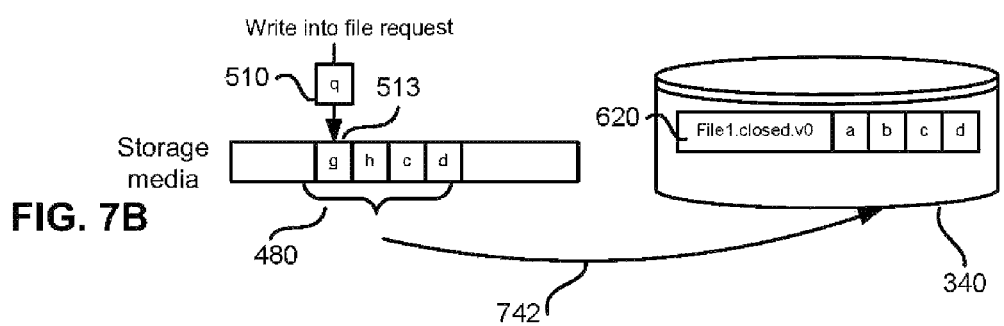
Figure 7C:
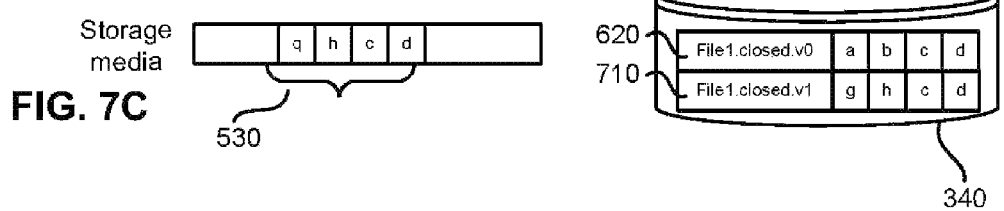
Figure 7D:
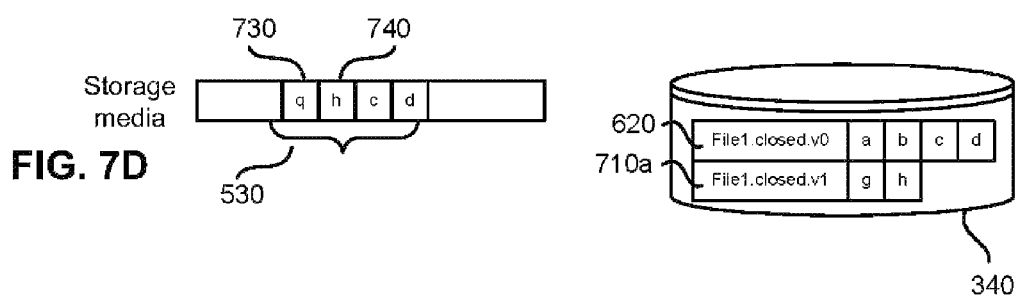

At the time (or after) of closing/saving an open file 480, the open backup 620 of the file 480 on the data storage 340 is also closed (see FIG. 7A). FIG. 7B illustrates a situation when another write request is received (i.e., file is open again for editing by a user). In this example, a write request requires writing a data set 510 in place of the data set 513. The entire file 480 is backed up onto the data storage 340 by a procedure 742 as an uneditable new version 710 (see FIG. 7C). The write request is executed and the data set 510 is written in place of the data set 513 and the file 480 is converted into a file 530, as shown in FIG. 7C.

Please note that in order to write the data set 513 into the file 620 on the storage medium 340, it is not necessary to wait until the data set 513 is backed up. The data set 513 can be placed in a computer memory or in an intermediate container and subsequently moved to the data storage 340.

Also note that, when a write request, requiring writing the data set 510 in place of the data set 513 is received, a new version of an uneditable backup 710a (see FIG. 7D) of the file 530 can be created on the data storage 340. Then, only the data sets that are different from the ones included in the backup file 620 are backed up (i.e., only the data sets 730 and 740 are backed up).

FIGS. 8-9 illustrate the exemplary embodiment where, upon receiving a write request, an entire file is backed up onto a data storage and also new data sets to be written onto the data storage are backed up. This exemplary embodiment is identical to the embodiments depicted in FIGS. 6-7, except for the situation shown in FIGS. 8B-8C.

FIG. 8C illustrates a situation when a write request requires writing the data set 440 into the data set 413 (of the file 430) that has already been backed up (see 613 in FIG. 8B). The data set 440 is written over the data set 413. In this scenario, the data set 440 is backed up by a procedure 840 onto the data storage 340 replacing the already backed up data set 613.

FIG. 10 illustrates and exemplary embodiment when, upon receiving a write request, an entire file is backed up onto a data storage and all data sets to be written to the data storage are backed up as well. The exemplary embodiments depicted in FIGS. 10A and 10B are identical to the ones depicted in FIGS. 6A-6B and 8A-8B.

Figure 10A:
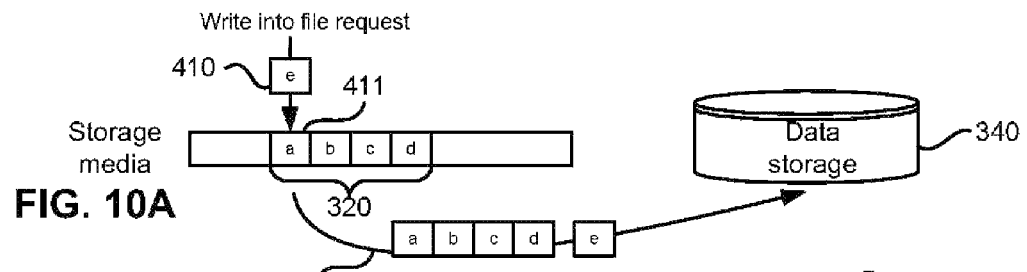
FIG. 10 illustrates an exemplary embodiment, where, upon write into a file request, the entire file is backed up into a data storage and all the parts of the file to be written into the data storage are backed up.
Figure 10B:
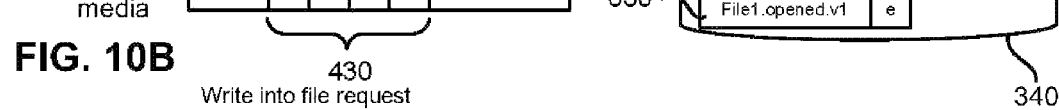
Figure 10C:
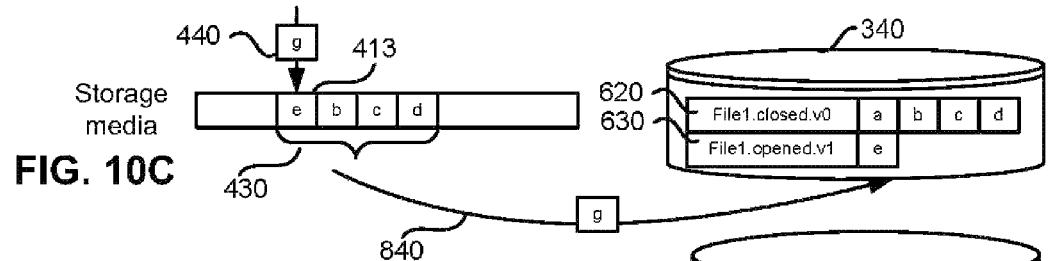
Figure 10D:
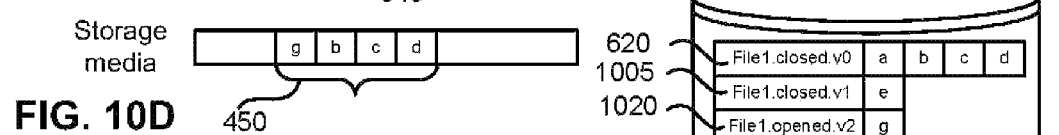

FIG. 10C illustrates a situation when a write request requires writing the data set 440 into the data set 413 (of the file 430) that has already been backed up. The data set 440 is written over the data set 413. In this scenario, the backup 630 (uneditable version of a backup 1005 in FIG. 10D) is closed on the data storage 340 and a new version of an editable backup (see 1020 in FIG. 10D) is created. The data set 440 is backed up by a procedure 840 onto the data storage 340.

Figure 10E:
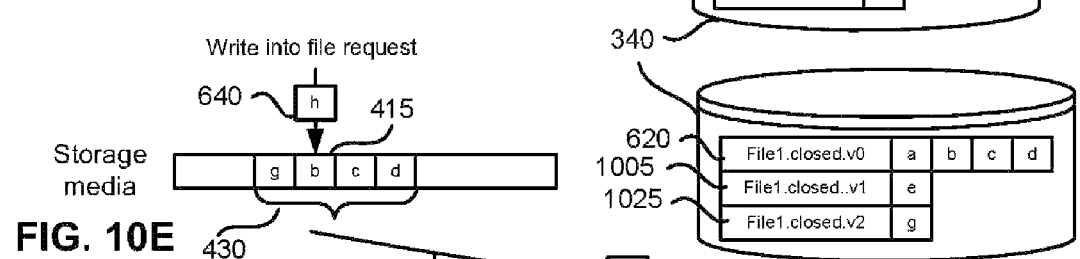
Figure 10F:
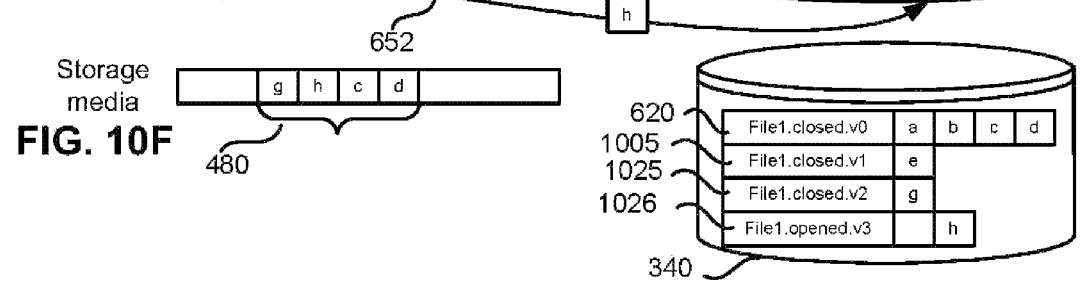
Figure 12A:
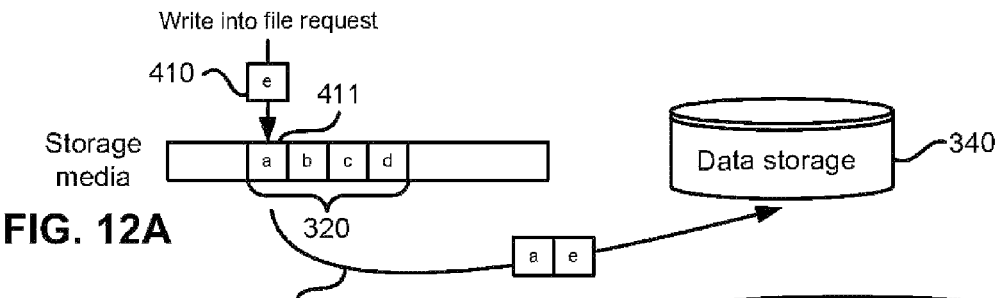
Figure 12B:
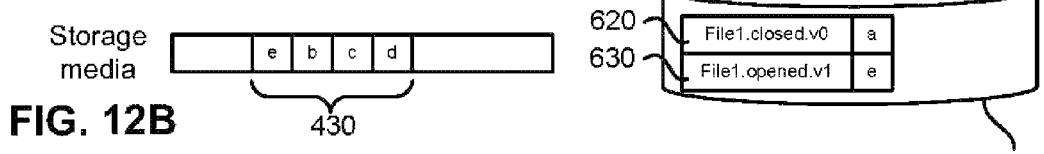
Figure 12C:
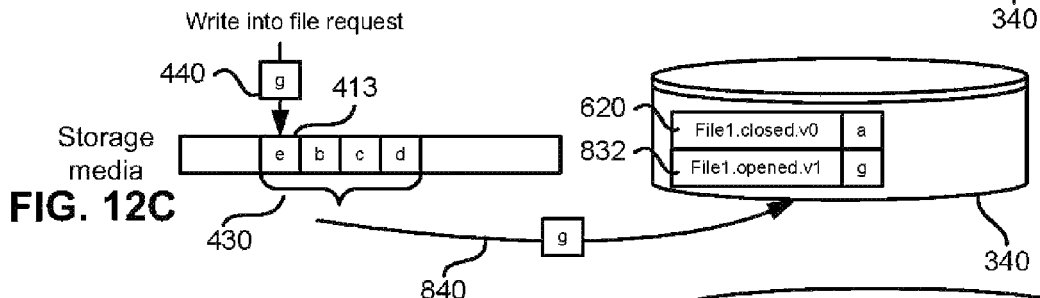
Figure 12D:
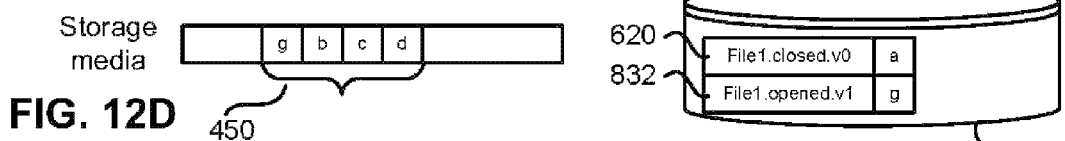
Figure 12E:
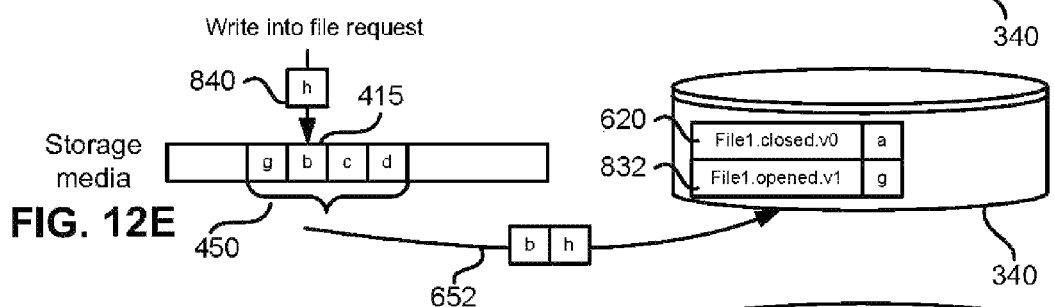
Figure 12F:
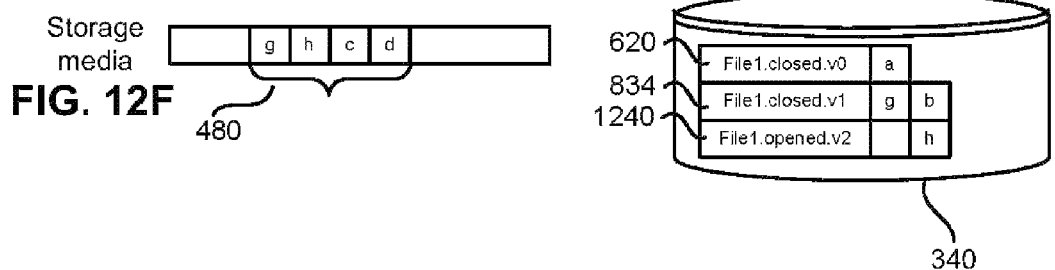

FIG. 10E illustrates a situation when another write request is received (i.e., file is open again for editing by a user). In this example, a write request requires writing a data set 640 in place of the data set 415. The write request is executed and the data set 640 is written in place of the data set 415 and the file 430 is converted into a file 480, as shown in FIG. 10F. The data set 640 is backed up by a procedure 652 into an already open backup 1026 (see FIG. 10F).

At the time (or after) of closing/saving an open for editing file 480, the open backup 1026 of the file 480 on the data storage 340 is also closed (see FIG. 10f). Subsequent write operations with the file 480 after it is open for editing are performed as discussed above.

FIG. 11 illustrates an exemplary embodiment, where, upon receiving a write request, all data sets of the file to be written over by new data are backed up. In this exemplary embodiment, a write request requires writing a data set 410 in place of a data set 411 (FIG. 11A). A first version of an editable backup 412 is created on the data storage 340 as shown in FIG. 11B. The data set 411 is backed up by a procedure 330 onto the data storage 340. Then, the write request is executed and the data set 410 is written in place of the data set 411. Thus, the file 320 is converted into a file 430.

Please note that in order to write the data set 410 into the file 320, it is not necessary to wait until the data set 411 is backed up. The data set 411 can be placed in a computer memory or in an intermediate container and subsequently moved to the data storage 340.

FIG. 11C illustrates a situation when a write request requires writing the data set 440 into the data set 413 (of the file 430) that has already been backed up. In this embodiment, a new version of an editable backup 1114 (see FIG. 11D) is created and the data set 413 is backed up by a procedure 1110 (see FIG. 11C) into the backup 1114 on the data storage 340. Then, the write request is executed and data set 440 is written in place of the data set 413. Subsequently, the 430 is converted into the file 450 and the backup of the file 412 is closed (see backup 1112 in FIG. 11D).

FIG. 11E illustrates an example, when a write request requires writing a data set 460 in place of a data set 415. First, the data set 415 is backed up onto the data storage 340 into a current version of an editable backup 1114 (see FIG. 11B) by a backup procedure 452. Then the write request is executed, and the data set 460 is written in place of the data set 415 and, subsequently, the file 450 is converted into the file 480.

At the time (or after) of closing/saving an open for editing file 480, the open backup 1114 of the file 480 on the data storage 340 is also closed.

FIGS. 12-13 illustrate exemplary embodiments, when, upon receiving a write request, the data sets of the files to be overwritten by new data sets are backed up along with the new data sets. In this embodiment the situation is similar to the one depicted in FIGS. 8-9, except that in FIG. 12A an entire file is not backed up, but only the data sets to be overwritten by the new data sets are backed up onto the data storage 340.

FIGS. 14-15 illustrate the exemplary embodiments, when, upon receiving a write request, only the data sets to be overwritten by the new data sets are backed up onto a data storage and each of the new data sets is backed up onto the data storage. In this embodiment the situation is similar to the one depicted in FIGS. 10-11, except that in FIG. 14A an entire file is not backed up, but only a data set to be overwritten by a new data set, which is also backed up onto the data storage.

Figure 16:
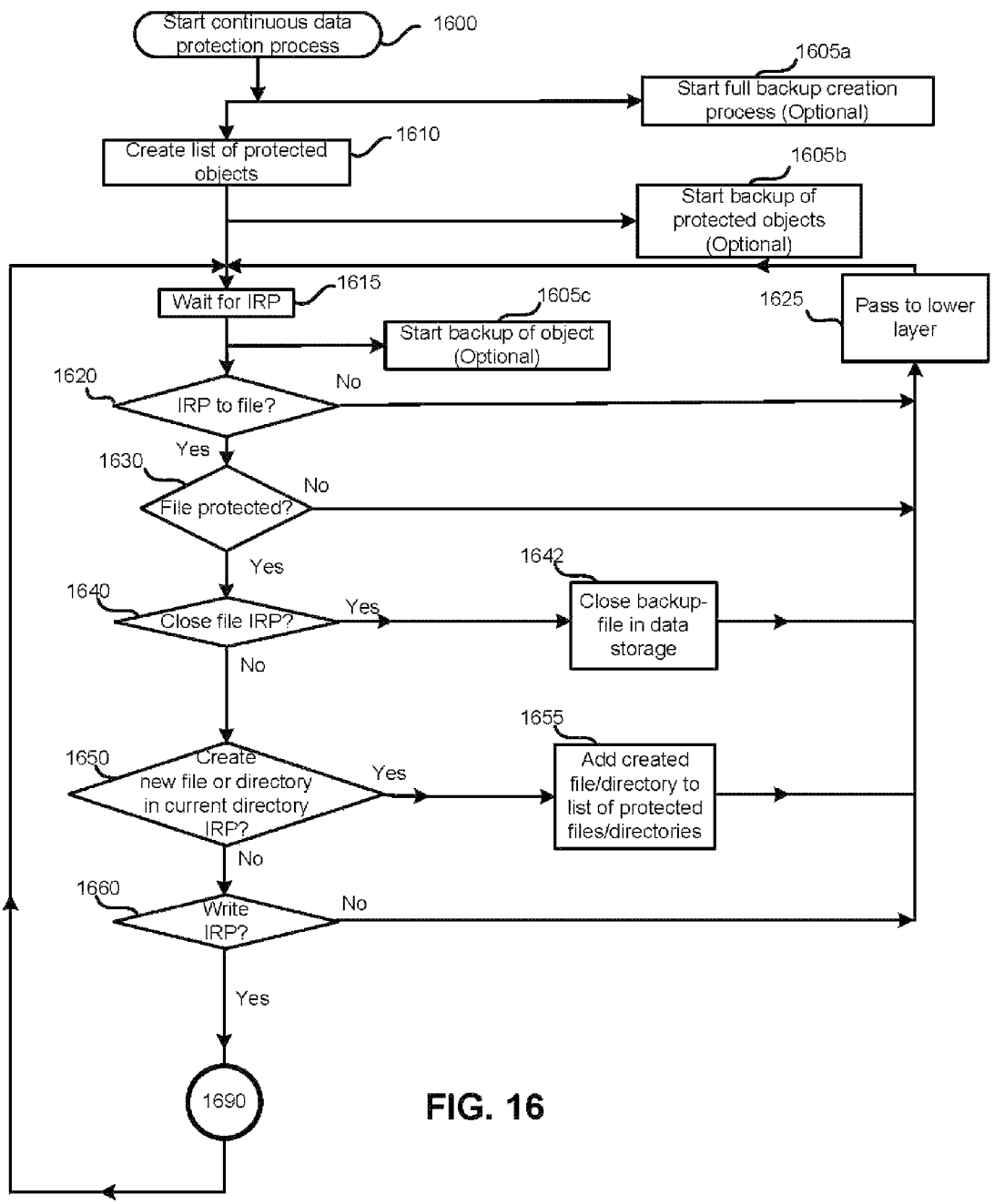
FIG. 16 illustrates a flow chart of a continuous data backup process in accordance with the exemplary embodiment.

FIG. 16 illustrates a flow chart of a continuous data backup process in accordance with the exemplary embodiment. The continuous data protection procedure begins at step 1600. After the start of continuous data protection procedure, process of the full block-level or file level initial backup 1605a of all storage media can be started in parallel with the step 1610, wherein the list of protected objects is created. The protected objects can be files and/or directories. The list of protected objects duplicates that part of the file system tree which contains a protected object.

For example, the user decides to protect \Folder1\Folder2. Folder1 contains File11 and File12. Folder2 contains File21 and File22. If this is the case then we create the following folders inside the tree storage: \Storage\Tree\D.Folder1, \Storage\Tree\D.Folder1\D.Folder2, and the following files: Storage\Tree\D.Folder1\D.Folder2\F.File21, Storage\Tree\D.Folder1\D.Folder2\F.File22. These object's creation occurs right after the user has decided to protect \Folder1\Folder2.

Note that there are no files created inside the tree storage for \Folder1\File11 and \Folder1\File12 because \Folder1 is not decided to be a protected one. Special prefixes in object names (D. for folder and F.—for file) can be used to avoid the problems when user decides to protect folder Folder having a sub-folder Object and moves out folder Object and then creates a file Object.

Note that in step 1610 the process of protecting objects can be started instead of a full backup of the storage media. Also note, the backup of protected object(s) to a data storage can be created if the WRITE IRP (an interrupt request packet) is passed to this protected object (see FIGS. 6-10). In step 1615, the continuous data protection process waits for the IRP. Note that the IRP can be referred to using different names, but, in general, is a request to the OS kernel to perform some action relating to the files/directories, such as a write or a read operations performed on the file.

Once the IRP is received, the IRP is analyzed. If the IRP is not pointed to the file or directory (step 1620), then this IPR is passed to a lower layer (step 1625). If in step 1620, the IRP is pointed to a file/directory, then the process goes to step 1630, where the IRP is analyzed, and if it is not pointed to the protected file/directory (if any of them are present in list of protected objects), then this IPR is passed to a lower layer (step 1625). If IRP is pointed to the protected file/directory, then in step 1640 is checked is it a Close file IRP.

Please note that a Close file IRP, for the purpose of this discussion, means that a user has completed his actions with a file that he opened. According to the exemplary embodiment, a user can stop working with an open file at any time. It can be done automatically by setting a data security application in such a way that an open file on the data storage 340 is closed upon invocation of a particular event (such as, for example, an interruption, switching between open files, an expiration of the pre-set time-out, an attempt by a user to save the file or an automatic attempt by a system or an application to save the file, etc.).

If in step 1640 the IRP is a Close file IRP, then backup-file on the data storage is closed and the process goes to step 1642, wherein the backup file on the data storage is closed, after that the process goes to step 1625. If in step 1640 the IRP is not a Close file IRP, then backup-file on the data storage is closed and the process goes to step 1650, wherein is checked if new file or directory created in current protected directory.

If a new file or a directory is created in a current protected directory, then this object is included into a list of protected objects, such as, for example, \Storage\Tree\D.Folder1\D.Folder2 for Folder2 created in Folder1 on the Storage (for example, storage media 340), and the Storage\Tree\D.Folder1\D.Folder2\F.File21 for File21 created in the Folder2, which is located in the Folder1 on the Storage (for example, storage media 340). Then, the process goes to step 1625.

If in step 1650 a new file or a directory is not created in a current protected directory, then the process goes to step 1660, where it is checked if the IRP is not a Write to file IRP. If the IRP is Write to file IRP, then the process goes to step 1625, otherwise the process goes to step 1690, and, then, the process goes back to step 1615.

Figure 17A:
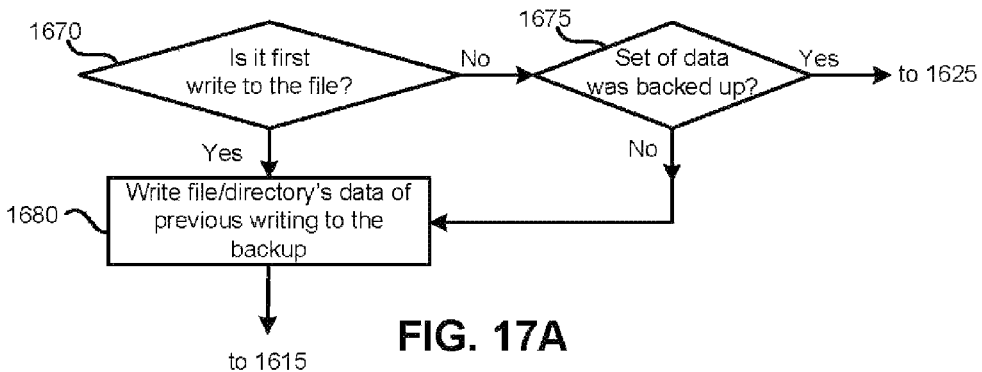
FIGS. 17A-17F illustrate parts of the flow chart depicted in FIG. 16 according to a type of a backup used.

FIGS. 17A-17F illustrate parts of the flow chart depicted in FIG. 16 according to a type of a backup used (i.e., for scenarios depicted in FIGS. 4-15). FIG. 17A illustrates a step 1690 of a flowchart shown in FIG. 16 that takes place after the step 1660. The step 1690 reflects the scenario shown in FIGS. 4-5. If an IRP is a Write IRP, then at step 1670 is determined if it is a first write up to a file (for example, writing the data set 410 into the data set 411 of the file 320). If it is a first write up request, then the data set 411 is backed up onto the data storage as step 1680. If, at step 1670, it is determined that a write request, requiring writing a data set (for example 410) into a file (for example 320) is not the first one, then at step 1675 it is determined if the data set (for example 411) has been backed up.

If the data set (for example 411) has been backed up, then a new data set (i.e., 410) is not backed up and the process moves on to a step 1625. If the data set (for example 411) has not been backed up, then the process moves on to a step 1680 described above.

Note that "a first write request" refers to writing a data set into re-opened file that was previously closed by a user. It can also refer to a file that was closed automatically by a security application operating in such a way that an open file on a data storage is closed upon invocation of a particular event (such as, for example, an interruption, switching between open files, an expiration of the pre-set time-out, an attempt by a user to save the file or an automatic attempt by a system or an application to save the file, etc.).

Figure 17B:
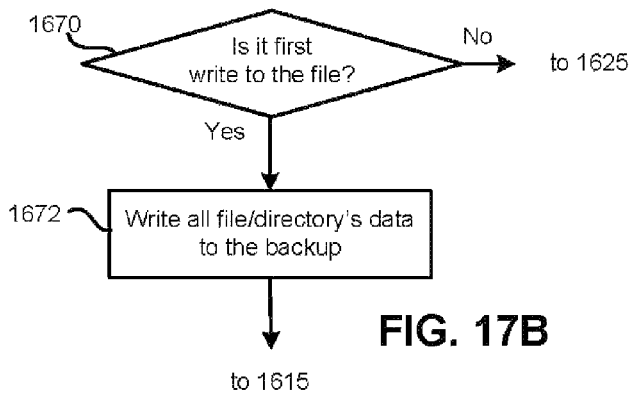

FIG. 17B illustrates a step 1690 of a flowchart shown in FIG. 16 that takes place after the step 1660. The step 1690 reflects the scenario shown in FIGS. 6-7. If IRP is a Write IRP, then at step 1670 it is determined if it is a first write request for writing a data set (for example 410) into a file (for example 320). If it is a first request, then an entire file (i.e., file 320) is backed up onto a data storage. Then, the process moves on to step 1615. If the write request is not a first request, then the process moves to step 1625.

Figure 17C:
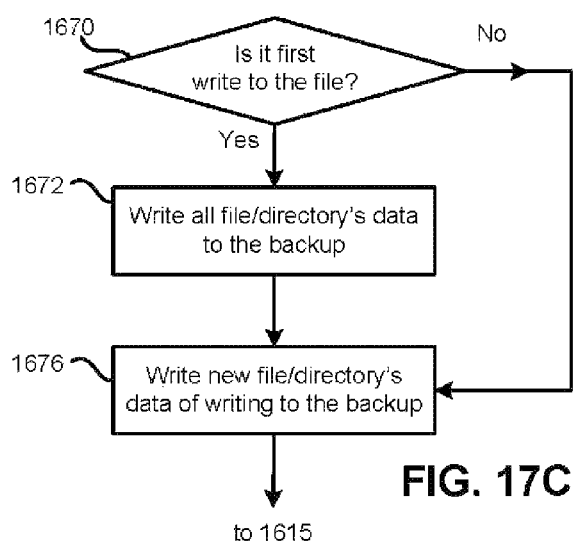

FIG. 17C illustrate a step 1690 of a flowchart shown in FIG. 16 that takes place after the step 1660. The step 1690 reflects the scenario shown in FIGS. 8-9 and 10. If an IRP is a Write IRP, then, at step 1670, it is determined if it is a first write request for writing a data set (for example, 410) into a file (for example, 320). If it is a first request, then an entire file is backed up onto the data storage. A data set (i.e., 410) is backed onto a data storage as well, and the process moves to step 1615. If the write request is not a first request, then the process moves on to step 1676.

Figure 17D:
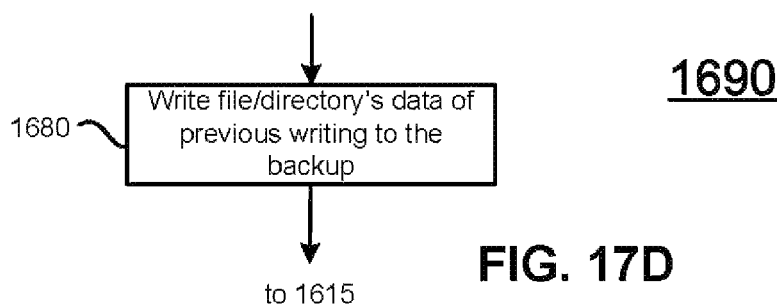

FIG. 17D illustrates a step 1690 of a flowchart shown in FIG. 16 that takes place after the step 1660. The step 1690 reflects the scenario shown in FIG. 11. If an IRP is a Write IRP, then, at step 1680, a data set contained in a file (for example, the data set 411) is backed up onto a data storage. The data set being backed up does not overwrite a previously backed up data set, if such backed up data set exists. Then, the process moves to step 1615.

Figure 17E:
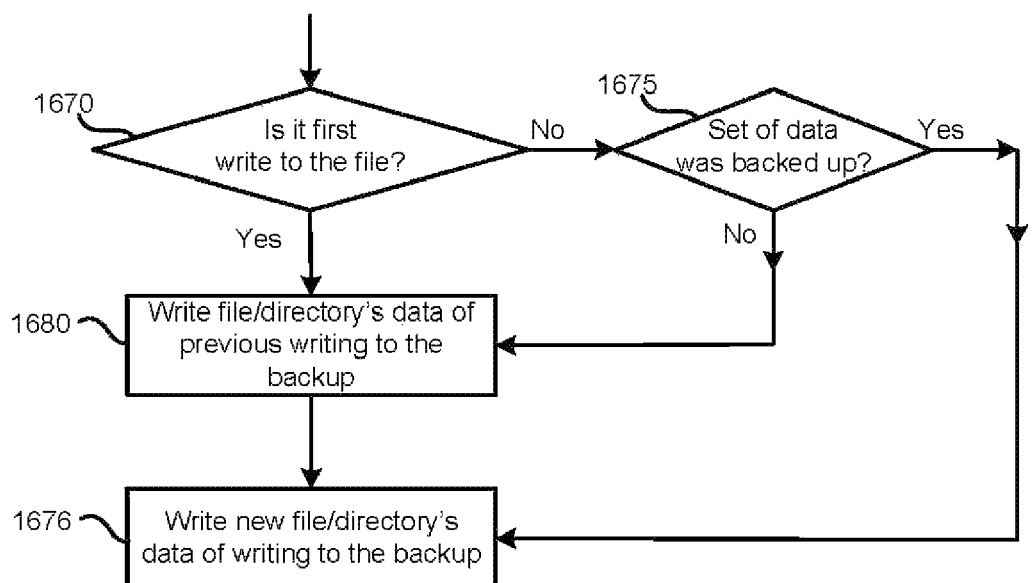

FIG. 17E illustrates a step 1690 of a flowchart shown in FIG. 16 that takes place after the step 1660. The step 1690 reflects the scenario shown in FIGS. 12-13. If an IRP is a Write IRP, then, at step 1670, it is determined if a write request is a first request for writing a data set (for example, 410) into a file (for example, 320). If it is a first request, then the data set (i.e., 411) is backed up onto a data storage at step 1680. A data set to be written into a the file (i.e., data set 410) is backed up onto a data storage, as well, at step 1676.

If it is determined, at step 1670, that the write request is not a first request, then, at step 1675, it is determined if the data set (i.e., 411) has been already backed up. If it has been backed up, then only the new data set (i.e., 410) is backed up onto the previously backed up data set. Then, the process moves to step 1625. If the data set (i.e., 410) has not been backed up yet, the process moves to step 1676.

Figure 17F:
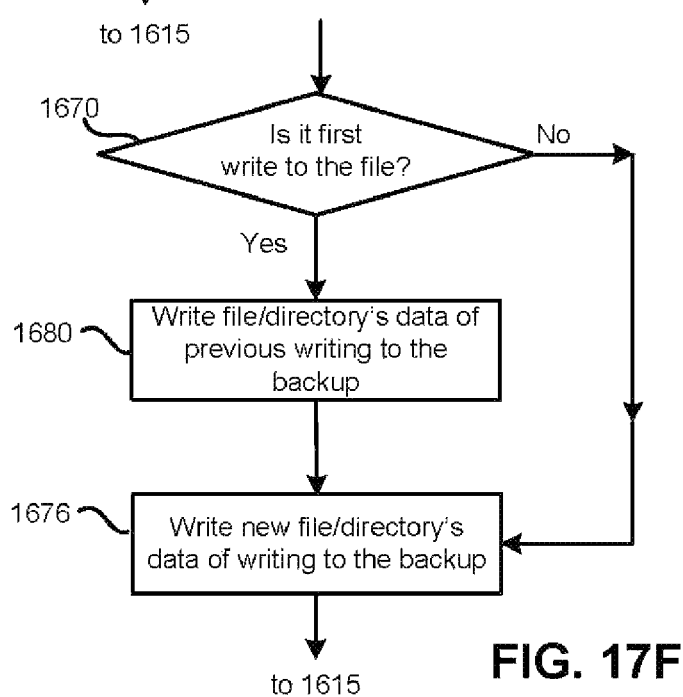

FIG. 17F illustrates a step 1690 of a flowchart shown in FIG. 16 that takes place after the step 1660. The step 1690 reflects the scenario shown in FIGS. 14-15. If an IRP is a Write IRP, then a data set contained in file (for example, the data set 411), is backed up at step 1680 and, at step 1676, a data set to be written into a file (i.e., data set 410), is also backed up onto a data storage. In this case, the new data set (i.e., the data set to be written into a file) does not overwrite a previously backed up data set on the data storage.

Figure 18:
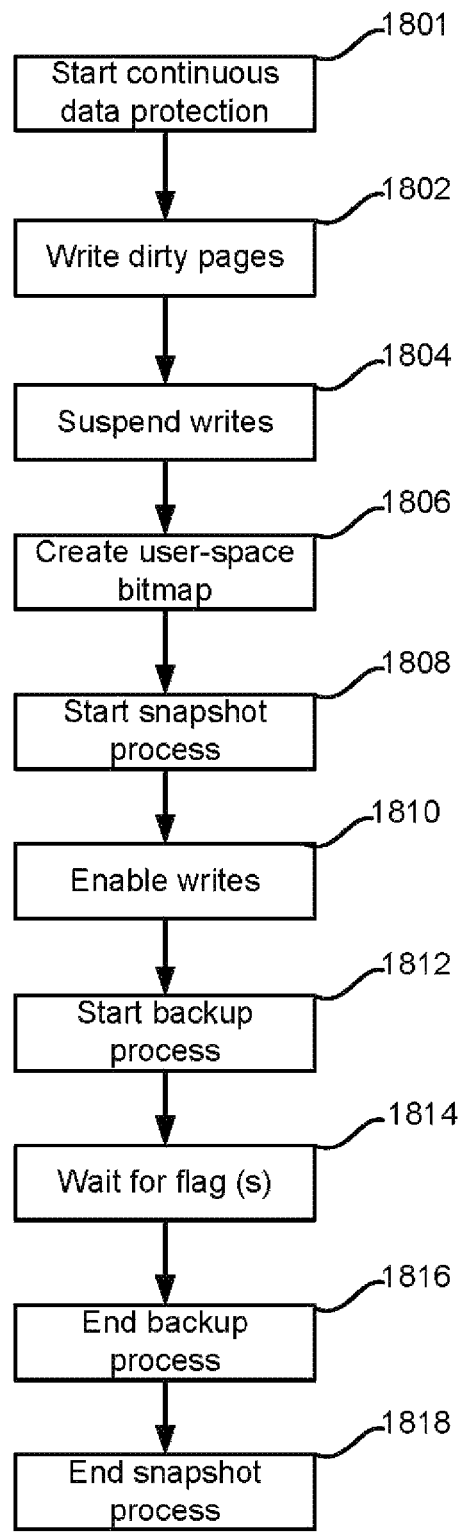
FIG. 18 illustrates a backup method, in accordance with the exemplary embodiment.

FIG. 18 illustrates a backup method in accordance with the exemplary embodiment. As shown in FIG. 18, continuous data protection process begins at step 1801. Note that the snapshot process may run asynchronously. In other words, once the continuous data protection process is launched, it can proceed in a separate thread, asynchronously relative to the process illustrated on FIG. 18.

After the write file request is received, a data, required to be written based on the write file request, is backed up into the incremental backup. After step 1801, the "dirty pages" are written from the cache to storage (step 1802). Dirty pages are the pages in an OS cache that contain information to be written into a storage device, but that have not been written due to an OS policy or other OS mechanisms (for example, a "lazy write" approach used in some modern OSs). The next step (step 1804) suspends write operations.

These suspended write operations are added to a special list, and a parameter is returned to the operating system, informing the operating system that these write operations have a "pending" status. In other words, the operating system will know that the write command execution has been postponed until later. In step 1806, a user space bitmap is created. Drivers of the operating system are not used to create it. Rather, the storage medium (for example, a disk drive) is read directly, the file system structure is identified, and the data blocks that are being used are identified.

It should be noted that although in the exemplary embodiment the bitmap is created on a data block level, it is possible that the bitmap creation procedure is related to file system's reflection into a block space of the storage device, and considers only non-utilized blocks (as opposed to free blocks). Thus, the data blocks that are being used are tagged with, for example, a 1 in the bitmap, and the data blocks that are not used are tagged as 0 in the bitmap.

Note that the size of the data block can be relatively large. For example, it can be larger than a typical sector in a hard disk drive. In other words, as discussed below, there may be a need for a further step that determines which part of the data block is actually being used, if the data block is relatively large. Note that the values used in the bitmap can be not only binary 0s and 1s. As another option, the bitmap can be used to store information about bad blocks. Note also that the bitmap can be created and managed in a user space, or, alternatively, in an OS kernel space.

In step 1808, the snapshot process begins. Creation of a snapshot is disclosed in the co-owned U.S. Pat. No. 7,246,211 entitled "System and method for using file system snapshots for online data backup" and in the co-owned U.S. Pat. No. 7,047,380 entitled "System and method for using file system snapshots for online data backup." Note that the snapshot process can run asynchronously. In other words, once the snapshot process is launched, it can proceed in a separate thread, asynchronously relative to the process illustrated in FIG. 18.

In step 1810, the write operations are enabled. In step 1812, the backup process is started. Note that the backup process is also an asynchronous process. Also, note that a snapshot and a backup processes can be either synchronous or (preferably) asynchronous relative to each other. Synchronization can be performed using access to the bitmap as a serialization mechanism. Once a flag, indicating that the backup process is completed, is received (in step 1814), the backup process is ended at step 1816. Then, the snapshot process also ends at step 1818.

Figure 19:
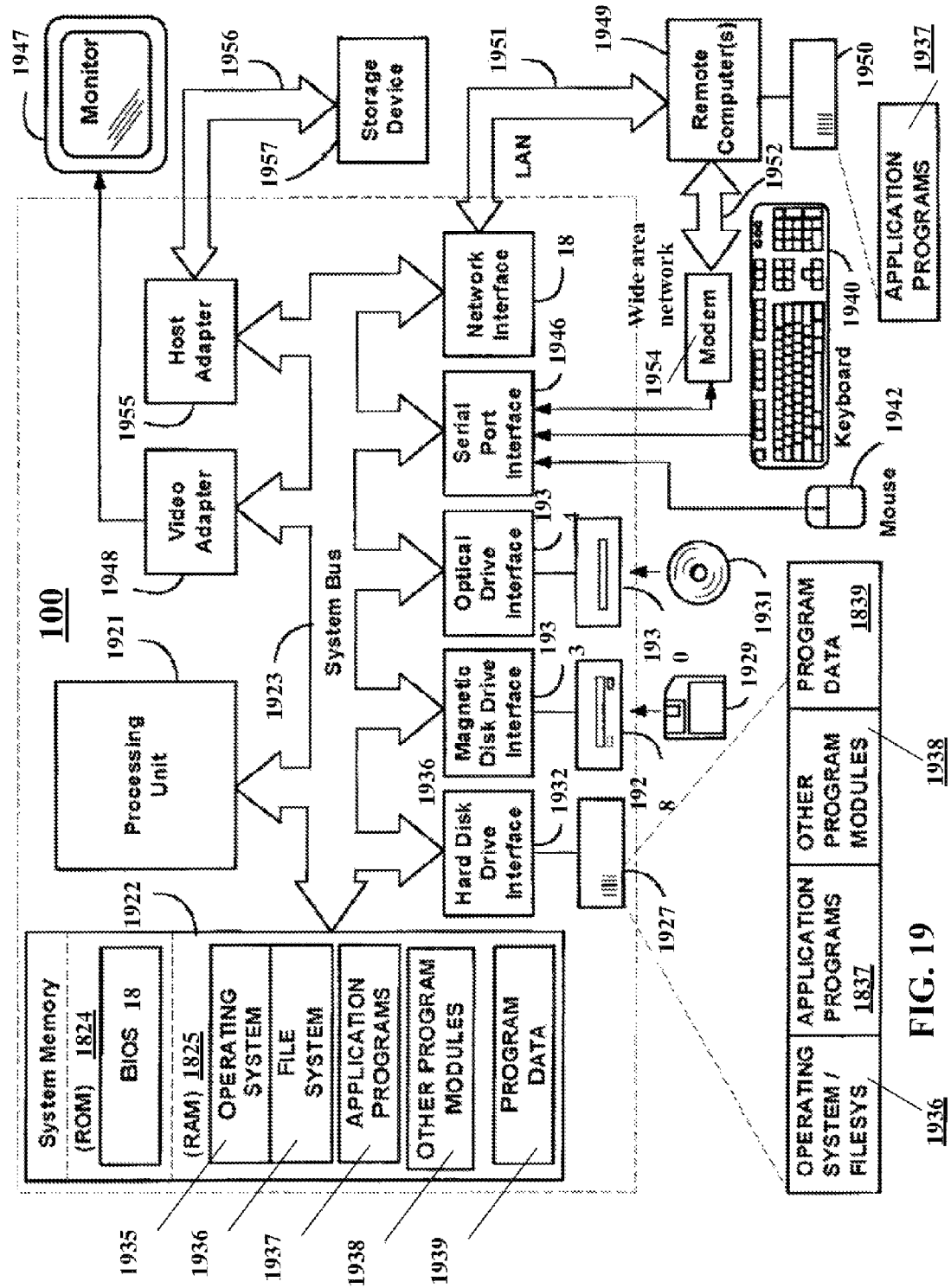
FIG. 19 illustrates an exemplary computer system, on which the exemplary embodiments can be implemented.

With reference to FIG. 19, an exemplary system for implementing the invention includes a general purpose computing device in the form of a computer or server 100 or the like, including a processing unit 1921, a system memory 1922, and a system bus 1923 that couples various system components including the system memory to the processing unit 1921. The system bus 1923 may be any of several types of bus structures including a memory bus or memory controller, a peripheral bus, and a local bus using any of a variety of bus architectures.

The system memory includes read-only memory (ROM) 1924 and random access memory (RAM) 1925. A basic input/output system 1926 (BIOS), containing the basic routines that help to transfer information between elements within the personal computer 100, such as during start-up, is stored in ROM 1924. The computer 100 may further include a hard disk drive 1927 for reading from and writing to a hard disk, not shown, a magnetic disk drive 1928 for reading from or writing to a removable magnetic disk 1929, and an optical disk drive 1930 for reading from or writing to a removable optical disk 1931 such as a CD-ROM, DVD-ROM or other optical media.

The hard disk drive 1927, magnetic disk drive 1928, and optical disk drive 1930 are connected to the system bus 1923 by a hard disk drive interface 1932, a magnetic disk drive interface 1933, and an optical drive interface 1934, respectively. The drives and their associated computer-readable media provide non-volatile storage of computer readable instructions, data structures, program modules and other data for the personal computer 100.

Although the exemplary environment described herein employs a hard disk, a removable magnetic disk 1929 and a removable optical disk 1931, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 1929, optical disk 1931, ROM 1924 or RAM 1925, including an operating system 1935 (preferably Windows™ 2000). The computer 100 includes a file system 1936 associated with or included within the operating system 1935, such as the Windows NT™ File System (NTFS), one or more application programs 1937, other program modules 1938 and program data 1939. A user may enter commands and information into the personal computer 100 through input devices such as a keyboard 1940 and pointing device 1942. Other input devices (not shown) may include a microphone, joystick, game pad, satellite dish, scanner or the like.

These and other input devices are often connected to the processing unit 1921 through a serial port interface 1946 that is coupled to the system bus, but may be connected by other interfaces, such as a parallel port, game port or universal serial bus (USB). A monitor 1947 or other type of display device is also connected to the system bus 1923 via an interface, such as a video adapter 1948. In addition to the monitor 1947, personal computers typically include other peripheral output devices (not shown), such as speakers and printers.

A data storage device 1957, such as a hard disk drive, a magnetic tape, or other type of storage device is also connected to the system bus 1923 via an interface, such as a host adapter 1955 via a connection interface 1956, such as Integrated Drive Electronics (IDE), Advanced Technology Attachment (ATA), Ultra ATA, Small Computer System Interface (SCSI), SATA, Serial SCSI and the like.

The computer 100 may operate in a networked environment using logical connections to one or more remote computers 1949. The remote computer (or computers) 1949 may be another personal computer, a server, a router, a network PC, a peer device or other common network node, and typically includes many or all of the elements described above relative to the personal computer 100. may further include a memory storage device 1950. The logical connections include a local area network (LAN) 1951 and a wide area network (WAN) 1952. Such networking environments are commonplace in offices, enterprise-wide computer networks, Intranets and the Internet.

When used in a LAN networking environment, the personal computer 100 is connected to the local area network 1951 through a network interface or adapter 1953. When used in a WAN networking environment, the personal computer 100 typically includes a modem 1954 or other means for establishing communications over the wide area network 1952, such as the Internet.

The modem 1954, which may be internal or external, is connected to the system bus 1923 via the serial port interface 1946. In a networked environment, program modules depicted relative to the personal computer 100, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer system operable to provide online continuous data protection, the system comprising:
    a processor;
    a memory coupled to the processor and storing instructions to work with a file system;
    the file system that stores files on a storage media and addresses the storage media using clusters as a minimal addressable unit;
    a file system driver that services the file system;
    a list of protected objects, the protected objects being files or directories,
    with each protected object residing below a protected folder including a first timestamp indicating when protection was enabled for that object and a second timestamp indicating when the object became unprotected;
    a storage media for storing the file system data, the storage media connected to the file system driver;
    a filter that monitors changes in the file system and having a set of files that are being monitored;
    wherein the filter redirects, to backup storage, only portions of files that are being modified prior to the modification, and overwrites those portions with new data;
    wherein, after a write file request is received, data is written to the file, file changes are copied to dirty pages, and the file changes are written to incremental backup,
    wherein each file cluster is written to the backup storage only once for every opening of the file, and
    wherein a new version of each file cluster is written to the backup storage for each time the file is opened;
    upon user action, the filter providing a rollback to a prior state with the data prior to the modification coming from the backup storage, and unmodified portions of the file coming from the storage media.

2. The system of claim 1, wherein a backup copy of the entire file is first created on the backup storage, by using a background backup process.

3. The system of claim 1, wherein a backup copy of modified clusters is created every time the file is opened.

4. The system of claim 1, wherein the backup copy of modified clusters is created periodically on the backup storage.

5. The system of claim 1, wherein a backup copy of a current version of the file is created periodically on the backup storage.

6. The system of claim 1, wherein the backup copy of modified clusters is created every time the file is saved.

7. The system of claim 1, wherein, while the file is opened, the new data is used to overwrite a corresponding cluster in the backup storage.

8. The system of claim 1, wherein the new data is also written to the backup storage.

9. The system of claim 1, wherein the set of files is defined based on being located in a designated folder.

10. The system of claim 1, wherein the file system driver backs up the entire file data onto the storage media.

11. The system of claim 1, wherein the file system driver backs up the data required to be written by a write request prior to writing it into the file to the storage media.

12. The system of claim 11, wherein the file system driver backs up only the file data to be written over by the write request.

13. The computer system of claim 11, wherein the file system driver backs up the entire file data to the storage media and the data required to be written into the file by the write request.

14. The computer system of claim 11, wherein the file system driver backs up to the storage media the data required to be written into the file by the write request.

15. The computer system of claim 11, wherein the file system driver translates the write request into one or more block write operations.

16. The computer system of claim 11, further comprising a storage device driver operable to read from a volume of the storage media and write to a volume of the storage media in block mode in response to the write request.

17. The system of claim 1, wherein the file system driver maintains the list.

18. The system of claim 1, wherein a size of the clusters depends on file size.

19. A method of providing online continuous data protection, the method comprising:
   using a file system, storing files on a storage media and addressing the storage media using clusters as a minimal addressable unit,
   servicing the file system using a file system driver;
   maintaining a list of protected objects, the protected objects being files or directories,
   with each protected object residing below a protected folder including a first timestamp indicating when protection was enabled for that object and a second timestamp indicating when the object became unprotected;
   storing the file system data on the storage media, wherein the storage media is connected to the file system driver;
   using a filter, monitoring changes in the file system, the filter a set of files that are being monitored;
   using the filter, redirecting, to backup storage, only portions of files that are being modified prior to the modification, and overwriting those portions with new data;
   wherein each file cluster is written to the backup storage only once for every opening of the file,
   wherein, after a write file request is received, data is written to the file, file changes are copied to dirty pages, and the file changes are written to incremental backup, and
   wherein a new version of each file cluster is written to the backup storage for each time the file is opened;
   upon user action, providing, using the filter, a rollback to a prior state with the data prior to the modification coming from the backup storage, and unmodified portions of the file coming from the storage media.

* * * * *